United States Patent [19]

Sargeant et al.

[11] Patent Number: 5,470,142
[45] Date of Patent: Nov. 28, 1995

[54] DISHWASHER

[75] Inventors: Adrian A. Sargeant; William H. Currie, both of Dunedin; Willem Ouwens, Outram; Philip J. Brace, Auckland; Robert W. Todd, Dunedin; Hans-Joachim Scholz, Otago, all of New Zealand

[73] Assignee: Fisher & Paykel Limited, Auckland, New Zealand

[21] Appl. No.: 992,828

[22] Filed: Dec. 18, 1992

[30] Foreign Application Priority Data

Dec. 20, 1991 [NZ] New Zealand ............... 241093

[51] Int. Cl.$^6$ .................................. A47B 43/00
[52] U.S. Cl. .......................... 312/258; 312/265.5
[58] Field of Search ................. 312/258, 265.5, 312/401, 406, 107, 72, 35, 121, 118, 124

[56] References Cited

U.S. PATENT DOCUMENTS

| | | | |
|---|---|---|---|
| 1,887,086 | 11/1932 | Erickson | 312/107 |
| 2,865,569 | 12/1958 | Levenborg | 312/258 |
| 3,587,939 | 6/1971 | Nystuen et al. | |
| 3,645,453 | 2/1972 | Morgan | |
| 3,810,480 | 5/1974 | Smith et al. | |
| 4,843,218 | 6/1989 | Husslein et al. | |

FOREIGN PATENT DOCUMENTS

| | | |
|---|---|---|
| 076739 | 4/1983 | European Pat. Off. |
| 268835 | 6/1988 | European Pat. Off. |
| 287984 | 10/1988 | European Pat. Off. |
| 2730489 | 1/1979 | Germany |
| 3531095 | 3/1987 | Germany |
| 1119449 | 7/1968 | United Kingdom |
| 2139084 | 11/1984 | United Kingdom |
| 2139083 | 11/1984 | United Kingdom |

*Primary Examiner*—Kenneth J. Dorner
*Assistant Examiner*—Gerald A. Anderson
*Attorney, Agent, or Firm*—Trexler, Bushnell, Giangiorgi & Blackstone, Ltd.

[57] ABSTRACT

A dishwasher having spray arm, motor and pump components configured and mounted so as to occupy very low height. In one form the complete wash system is arranged as a drawer which slides in and out of a cabinet. The cabinet opening is stiffened against racking forces by incorporating an inverse portal frame in the opening flange. A synchronous AC motor is used with the rotor running within the wash chamber driving a wash pump integrated with a rotating spray arm.

2 Claims, 26 Drawing Sheets

DISHWASHER

FIELD OF THE INVENTION

This invention relates to dishwashers, and in particular, but not solely, domestic dishwashers.

DESCRIPTION OF RELATED ART

Conventional domestic front loading dishwashers provide two racks for stacking dishes, one in the lower zone of the wash chamber and the other in the upper zone. Such dishwashers are normally designed to fit under a typical domestic kitchen bench top with a maximum height of 900 mm. Generally the lower rack is designed to take larger dishes, e.g. plates up to 280 mm in diameter, and because of the overall height limitation the upper rack can only take lower height dishes. Such dishwashers lack flexibility in that they cannot efficiently wash (in a single wash) dish loads made up of a mix of dish sizes other than that dictated by the manufacturer. For example, a load of large diameter plates exceeding the number that can be accommodated in the lower rack must be leaned using two completely separate wash cycles, even although the top rack could be empty. Further, it is not feasible to load soiled dishes unless all cleaned dishes are first removed. In addition it is not efficient to wash less than full loads. Washing must be deferred until the dishwasher has been completely filled.

The first two problems identified above can be overcome to some extent by the use of two dishwashers. However, cost and space factors usually mean this is not a viable option. The present invention proposes a solution to the above problems by providing a smaller dishwasher intended to be used as one module in a two-module pair. The dishwasher is of very low height to allow the option of "over and under" stacking of two modules below a kitchen bench.

Construction of a low height machine imposes severe design constraints.

In most conventional dishwashers components such as the wash pump and drain pump, along with associated electric motors, are mounted under the wash chamber thereby consuming height which could be available to the wash chamber. In U.S. Pat. No. 3,587,939 (Nystuen et al) wash and drain pumps driven by a common induction motor are disclosed which are located inside the wash chamber and the motor is operable submerged in the wash water. A disadvantage of this system is the need to seal the motor stator from the wash liquid. A drain pump which operates with a submerged motor rotor and a stator external to the pump casing is disclosed in EP 287,984 (Askoll SPA). However this pump requires the use of two separate chambers for the motor rotor and pump impeller respectively and is not easy to service in use. Further, it is not possible to use the motor disclosed to additionally drive a wash pump.

E 76,739 (Esswein), E 268,835 (Industrie Zanussi) and U.S. Pat. No. 4,810,480 (Smith and Faust) disclose other constructions where the wash and drain pumps are driven by a common motor where the direction of rotation of the motor determines which pump is operable. These constructions do not significantly reduce the height requirements of the wash system.

U.S. Pat. No. 3,645,453 (Morgan) and GB 1,119,449 disclose dishwasher spray arms which incorporate as an integral part the casing of the wash pump to produce a low height wash pump located within the wash chamber. However, these systems require a motor external to the wash chamber and the need for a dynamic seal for the motor driven shaft where it passes into the wash chamber.

A small top loading dishwasher ("Bauknecht") for mounting within a kitchen cupboard and able to be extended from the cupboard on slides has been manufactured by Philips Appliances, but this does not address the problems outlined above, and in particular requires users to lift the wash chamber lid after cupboard opening and complete withdrawal of the machine from the cupboard.

To allow for accurate measuring of wash liquid volume, and pre-heating of water before it is dumped into a hot wash chamber, it is known to use a separate water reservoir tank fed from the household cold water supply. Such systems are disclosed in DE 3,531,095, GB 2,139,083, GB 2,139,084 (Bosh-Siemens). Further the use of such a tank filled with cold water to condense out water vapour in the wash chamber during drying cycles is disclosed in DE, 2,730,489 (Bosch-Siemens). In all of these arrangements fabricated metal tanks are used which are mounted on a metal wash chamber and this increases manufacturing costs.

Currently available dishwashers use metal sheathed resistance heating elements mounted above the floor of the wash chamber. It is known to fabricate electrical heating elements using thick film resistors deposited on a substrate. Such heaters have been used in very low power applications such as in energy regulators. U.S. Pat. No. 4,843,218 (Bosch-Siemens) proposes the use of thick film technology to fabricate an electric cooking element. Such prior art does not, however, envisage a thick film resistive heater for application in a dishwasher where efficient and direct heating of wash liquid is required.

SUMMARY OF THE INVENTION

It is an object of the present invention to provide a dishwasher which will go some way towards overcoming the above mentioned disadvantages or which will at least provide the public with a useful choice.

In the first aspect the invention consists in a dishwasher comprising:
  a) a wash chamber adapted to accommodate dishes and within which wash liquid is circulated,
  b) a well provided in the floor of said chamber,
  c) an electric motor including:
    (i) a rotor mounted within said well, and
    (ii) a co-acting stator mounted outside said wash chamber on the exterior surface of said well, and
  d) a wash pump having an impeller driven by said rotor.

In second aspect the invention consists in a dishwasher comprising:
  a) a wash chamber adapted to accommodate dishes and within which wash liquid is circulated,
  b) a well provided in the floor of said chamber,
  c) an electric motor including:
    (i) a rotor mounted within said well, and
    (ii) a co-acting stator mounted outside said wash chamber on the exterior surface of said well,
  d) a wash chamber drain pump including:
    (i) an impeller located in said well together with said motor rotor, said impeller being driven by said rotor,
    (ii) a casing formed by the well walls proximate to said impeller,
    (iii) a liquid inlet and a liquid outlet in said casing, and
  e) a liquid passageway connecting said wash chamber with said casing inlet, said rotor when rotated in a first direction causing said pump to drain wash liquid from the wash chamber for delivery at said liquid outlet.

In a third aspect the invention consists in a dishwasher comprising:

a wash chamber adapted to accommodate dishes and within which wash liquid is circulated, an electric motor for driving a centrifugal wash pump having a vertical axis drive shaft projecting centrally into the floor of said wash chamber, a wash pump impeller driven by said motor shaft, a spray arm having liquid discharge nozzles rotatably supported in the bottom of said wash chamber for rotation about said wash pump impeller, said spray arm having central internal upper and side surfaces which define a co-acting casing for said wash pump impeller and which define a volute which allows delivery of wash liquid pumped from said casing to said nozzles, said spray arm central under surface being open to provide an axial flow inlet for said wash pump, a first annular aperture provided in the floor of said wash chamber immediately below and in registration with the wash pump inlet, a second substantially annular aperture provided in the floor of said wash chamber having a diameter much greater than said first aperture, and a plenum below the floor of said wash chamber which allows liquid to flow from the second annular aperture to the first annular aperture for induction up into said wash pump.

In a fourth aspect the invention consists in a dishwasher comprising:

a wash chamber adapted to accommodate dishes and within which wash liquid is circulated, an electric motor for driving a wash pump, a wash pump having an inlet and an outlet impeller driven by said motor, a spray arm generating means which discharges within said wash chamber and which is supplied with wash liquid from the outlet of said wash pump, a substantially annular aperture provided in the floor of said wash chamber having an outer diameter which is significant compared to the dimensions of the wash chamber floor, and a plenum below the floor of said wash chamber which allows liquid to flow from said annular aperture to the inlet of said wash pump.

In a fifth aspect the invention consists in a dishwasher comprising: a wash chamber adapted to receive dishes to be cleaned, a pump for circulating wash liquid within said chamber, a spray arm having nozzles therein which is rotatably mounted adjacent to the floor of said chamber which receives pressurized wash liquid from said pump and dispenses it through said nozzles into said chamber, and an electrical heating plate which forms part of the wash chamber surface such that at least a portion of the circulating wash liquid comes into thermal contact therewith, said heating plate consisting of a conductive substrate having one or more thick film resistive tracks formed on a surface of said heating plate.

In a sixth aspect the invention consists in a dishwasher comprising:

a wash chamber adapted to accommodate dishes and within which wash liquid is circulated, a rack within said chamber which supports dishes above the floor of said chamber, a rotatable spray arm having liquid discharge nozzles located in the bottom of said wash chamber under said rack, a pump which pressurises said spray arm with wash liquid, and mounting means located centrally in the floor of said chamber which rotatably supports said spray arm, said spray arm in turn comprising a hub portion and two diametrically opposed wing portions extending outwardly therefrom towards the side walls of said chamber, and said wing portions shaped such that they droop downwardly away from the hub portion.

In a sixth aspect the invention consists in a d29. A dishwasher comprising:

a moulded wash chamber adapted to accommodate dishes and within which wash liquid is circulated, a moulded reservoir tank integral with said wash chamber and sharing a common side wall with said wash chamber, said reservoir tank having a horizontal cross-sectional area much less than the horizontal cross-sectional area of said wash chamber, an electrically controlled water vale in use being connected to a source of water supply which is arranged to discharge into said reservoir tank, and a syphon means having an inlet in said reservoir tank and an outlet in said wash chamber, said syphon means being positioned at a height such that when water discharged from said valve into said reservoir tank reaches a level corresponding to a predetermined volume of wash liquid, syphonic action takes place to drain said predetermined volume of wash liquid from said reservoir tank into said wash chamber.

In a seventh aspect the invention consists in a dishwasher comprising:

a moulded wash chamber adapted to accommodate dishes and within which wash liquid is circulated, a moulded reservoir tank integral with said wash chamber and sharing a common side wall with said wash chamber, said common wall being capable of transmitting heat from the wash chamber to the reservoir tank and vice versa to thereby form a heat exchanger between said wash chamber and said reservoir tank, and means for transferring water from said reservoir tank to said wash chamber.

In an eighth aspect the invention consists in a household appliance comprising:

a) a wash chamber adapted to receive a load to be cleaned and within which wash liquid is circulated, b) a well provided in the floor of said chamber, c) an electric motor including:
 (i) a rotor mounted within said well, and
 (ii) a stator mounted outside said wash chamber circumferentially to the exterior surface of said well, d) a wash chamber drain pump including:
 an impeller located in said well on the rotor shaft, said rotor—drain impeller combination held in working positions without mechanical fastenings or restraints such that they may be disassembled simply by lifting them out of said wash chamber.

In a ninth aspect the invention consists in a diswasher comprising:

a) a wash chamber adapted to accommodate dishes and within which wash liquid is circulated, b) a well provided in the floor of said chamber, c) an electric motor including:
 (i) a rotor mounted within said well, and
 (ii) a stator mounted outside said wash chamber circumferentially to the exterior surface of said well, d) a wash chamber drain pump including:
 an impeller located in said well on the rotor shaft, e) a wash pump including (i) a wash pump impeller on the rotor shaft, and (ii) a spray arm having a liquid discharge nozzle rotatably supported in the bottom of said wash chamber for rotation about said wash pump impeller, said spray arm and rotor—wash impeller—drain impeller combination all held in working positions without mechanical fastenings or restrains such that they may be disassembled simply by lifting them out of said wash chamber.

In a tenth aspect the invention consists in a dishwasher comprising: a wash chamber adapted to receive dishes to be cleaned, a pump for circulating wash liquid within said chamber, a spray arm having nozzles therein which is rotatably mounted adjacent to the floor of said chamber which receives pressurized wash liquid from said pump and dispenses it through said nozzles into said chambers, said spray arm including at least one nozzle of the spray arm which is directed to produce a transverse jet of wash liquid having components tangential to the circular path traced by said nozzle and downwardly, and a drain sump provided in the floor of said wash chamber having an inlet positioned so as to be directly below and swept by said transverse jet with each rotation of said spray arm.

In an eleventh aspect the invention consists in a dishwasher comprising: a wash chamber adapted to receive dishes to be cleaned, a pump for circulating wash liquid within said chamber, a spray arm having nozzles therein which is rotatably mounted adjacent to the floor of said chamber which receives pressurized wash liquid from said pump and dispenses it through said nozzles into said chamber, said spray arm having at least one nozzle directed so as to produce a substantially horizontal and substantially radial jet of wash liquid, and said wash chamber at the height of said horizontal jet having a peripheral deformation in the corners thereof which acts as a vane to deflect said jet vertically such that wash liquid is sprayed vertically in areas of the wash chamber outside the diameter of the spray arm.

In a twelfth aspect the invention consists in a dishwasher comprising: a wash chamber adapted to receive dishes to be cleaned, a pump for circulating wash liquid within said chamber, a spray arm having nozzles therein which is rotatably mounted adjacent to the floor of said chamber which receives pressurized wash liquid from said pump and dispenses it through said nozzles into said chamber, said spray arm having at least one nozzle directed so as to produce a substantially horizontal and substantially radial jet of wash liquid, and said wash chamber at the height of said horizontal jet having a peripheral deformation on the planar sections of the walls thereof which acts as a vane to deflect said jet vertically to produce a laminar flow of wash liquid up said wall sections and on to the underside of the roof of said chamber such that wash liquid may drip off said roof to thereby come in contact with the upward facing surfaces of dishes within the chamber.

In a thirteenth aspect the invention consists in a cabinet for a household appliance of the open sided box type comprising: five side walls rigidly joined along their edges to leave a substantially rectangular opening defined by the free edges of four walls, and a flange around said four free edges, said flange on three edges configured as a portal frame with moment resisting corners and on the fourth edge as a beam linking the ends of the portal frame, the junctions of the beam and portal frame having no substantial resistance to bending moments.

In a fourteenth aspect the invention consists in a dishwasher comprising:

(a) a cabinet, (b) a wash system slidably mounted within said cabinet in such a manner that it may be withdrawn horizontally out of said cabinet for access thereto, said wash system including:

(i) an open top wash chamber adapted to accommodate dishes within which wash liquid is circulated, (ii) a spray generating means for producing a spray of wash liquid within said chamber, (iii) means for evacuating wash liquid from said chamber, and (c) a wash chamber lid mounted in the top of said cabinet, which lid is engaged with the wash chamber opening to sealably close off said wash chamber on retraction of the wash chamber.

In a fifteenth aspect the invention consists in a dishwasher comprising a cabinet, a wash chamber within said cabinet adapted to receive washing liquid to effect washing and to receive dishes to be washed, a horizontally disposed rotatable spray arm mounted in a lower portion of said wash chamber and having spray nozzles, a wash pump having an impeller, said wash pump being arranged to draw wash liquid from a lower part of said wash chamber and deliver said wash liquid to said spray nozzles, an electric motor driving said impeller, and the distances between the lowest level of said motor being of the order of 55 mm (fifty five millimeters).

In a sixteenth aspect the invention consists in an alternating current synchronous motor and starting drive comprising:

a stator including at least one pole pair and windings associated therewith, a permanent magnet rotor having at least one pole pair, sensing means for determining the angular position of the rotor, switching means for energising respective stator windings from the alternating current mains, and a controller which monitors the output of said sensing means and the waveform of the alternating current mains and fires the switching means connected to the stator winding with an appropriate segment of mains half-cycle which will cause rotor rotation in the desired direction or will increase the speed of rotor rotation.

In a seventeenth aspect the invention consists in a method of manufacturing a stator for a salient pole electric motor comprising the steps of:

(a) forming a laminated square flux return ring by:

(i) providing a continuous strip of workable magnetic material, (ii) cutting notches in one edge of said strip at a pitch equal to the side dimension of said square, (iii) winding said strip edgewise into a square helix by bending the strip edgewise at right angles tat each notch, the notches being on the inside of the bend and every fourth notch in registration, until the required stator thickness has been achieved;

(b) forming salient poles as lengths of magnetic material having end formation complementary to said flux ring notches;

(c) fitting pre-wound stator coils onto each pole; and (d) placing two or four salient poles into each flux return ring such that the salient poles lie in the same plane as said flux ring, extend diagonally from the corners of the flux ring, and the end formations lock within the complementary notches in the flux ring.

BRIEF DESCRIPTION OF THE DRAWINGS

FIG. 19 is a diagrammatic longitudinal cross section of a dishwasher showing the position of the wash chamber lid;

FIGS. 20 shows a diagrammatic view of the dishwasher lid and lid lifting mechanisms;

FIG. 21 is a detailed side elevation of the inner portion of the lid and lid lifter mechanism showing the lid at the start of the closing phase.

FIG. 22 is a detailed side elevation of the inner portion of the lid and lid lifter mechanism showing the lid at the completion of the closing phase.

FIG. 23 is a graph showing relative displacement of drawer, lid and lid lifter during the closing phase.

FIG. 24 is a part plan view of the wash chamber showing one form of means for holding dishes, such as plates, in position;

FIG. 25 is a part diametrical cross section of the lower part of the wash system corresponding to FIG. 12 showing the water path in detail;

FIG. 26 is a block circuit diagram of the electric motor control circuit;

FIG. 27 is an exploded view of the major spray arm wash pump and motor components;

FIG. 28 is an enlargement of the wash pump impeller;

DESCRIPTION OF THE PREFERRED EMBODIMENTS

In the preferred embodiments the dishwasher is constructed with a height dimension approximately half that of conventional front-loading domestic dishwashers. It is intended to be used alone or as one of a number, more usually one of a pair of such dishwashers.

Figure 1:
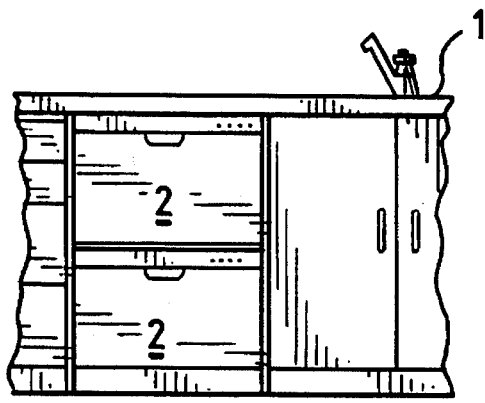
FIGS. 1 to 3 show a selection of ways in which dishwashers according to the present invention can be mounted in modular fashion in a kitchen installation.
Figure 2:
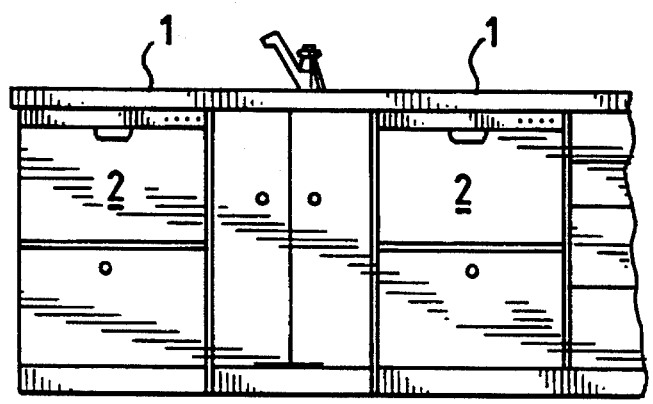
Figure 3:
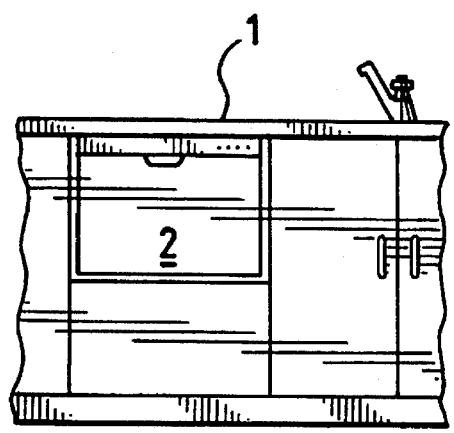

Referring to FIGS. 1 to 3, various installation concepts using one or two dishwashers according to the present invention are shown. It is a concept of the present invention to provide a modular dishwasher unit. In FIG. 1, two such dishwashers 2 are shown stacked one above the other under a sink bench 1 which will typically be between 850 and 900 mm above floor level. In FIG. 2 two dishwashers 2 are shown mounted one on either side of a sink forming part of the sink bench 1. In FIG. 3 only a single dishwasher 2 is provided under a sink bench 1. Because of the reduced height dimension a dishwasher according to the invention could be bench mounted. Thus each dishwasher 2 can be regarded as a modular unit which is an independent self contained dishwasher capable of accommodating any conventional dish load.

From FIG. 1 it can be seen that when two modular dishwasher units 2 are stacked one above the other the configuration is similar in external dimensions to conventional dishwashers. Two modular units 2 installed side by side immediately under a bench to pas in FIG. 2 offer the same capacity as a conventional dishwasher but avoid the inconvenience of a user having to bend down to reach the lower half of the dishwasher. Additionally access is improved in that a wash chamber 3 (see FIG. 5) may be slidably withdrawn from the cabinet 4 of a dishwasher unit by being mounted in the form of a drawer.

Some modular pair arrangements could be manufactured as such rather than pairing two individual modules at installation. For example the configuration shown in FIG. 1 could be paired at a maintenance to mechanically link the individual dishwasher cabinets. In such an arrangement there would be advantage in combining the plumbing arrangements as will be discussed later in this specification.

The provision of two independent dishwashers allows for considerable flexibility in operating modes.

1. One module operating, or two modules operating simultaneously with a mixed dish load. With each module capable of accommodating the largest item of dish load, this concept offers an increased capacity for large items.

2. One or both modules operating, but not necessarily simultaneously, where each module has either lightly soiled or heavily soiled dish load, and the appropriate wash programme set to suit the individual module.

3. One module being gradually filed with soiled dishes, while the second module is being emptied only as its clean dish load is being reused. For reasons of hygiene this is not practical with single dishwashers.

4. One module programmed for lightly soiled loads and the other module for heavily soiled loads.

5. One module switched on as soon as it has been filled with soiled dishes. That is, smaller loads may be efficiently washed.

Cabinet Construction

Figure 4:
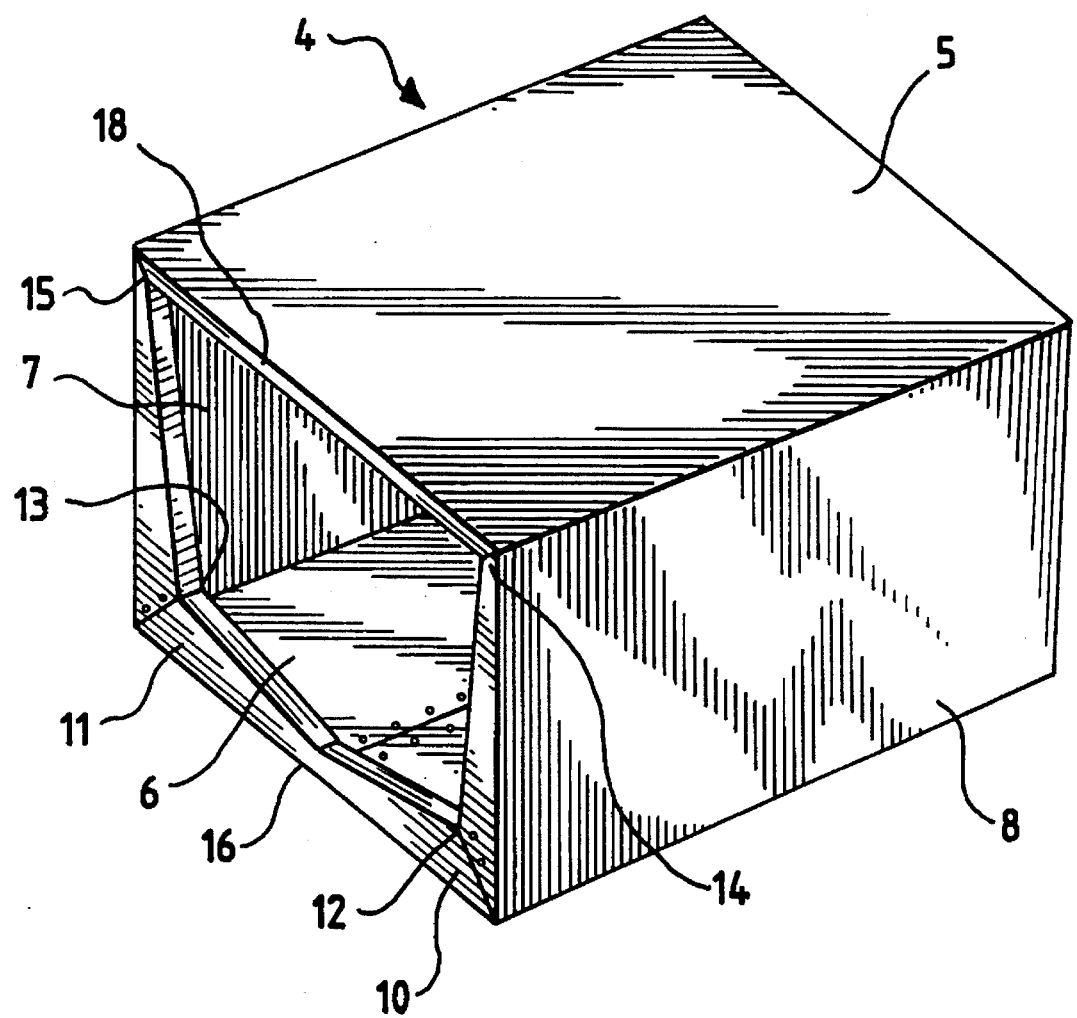
FIG. 4 is a perspective sketch of a cabinet for a dishwasher according to the invention.
Figure 44:
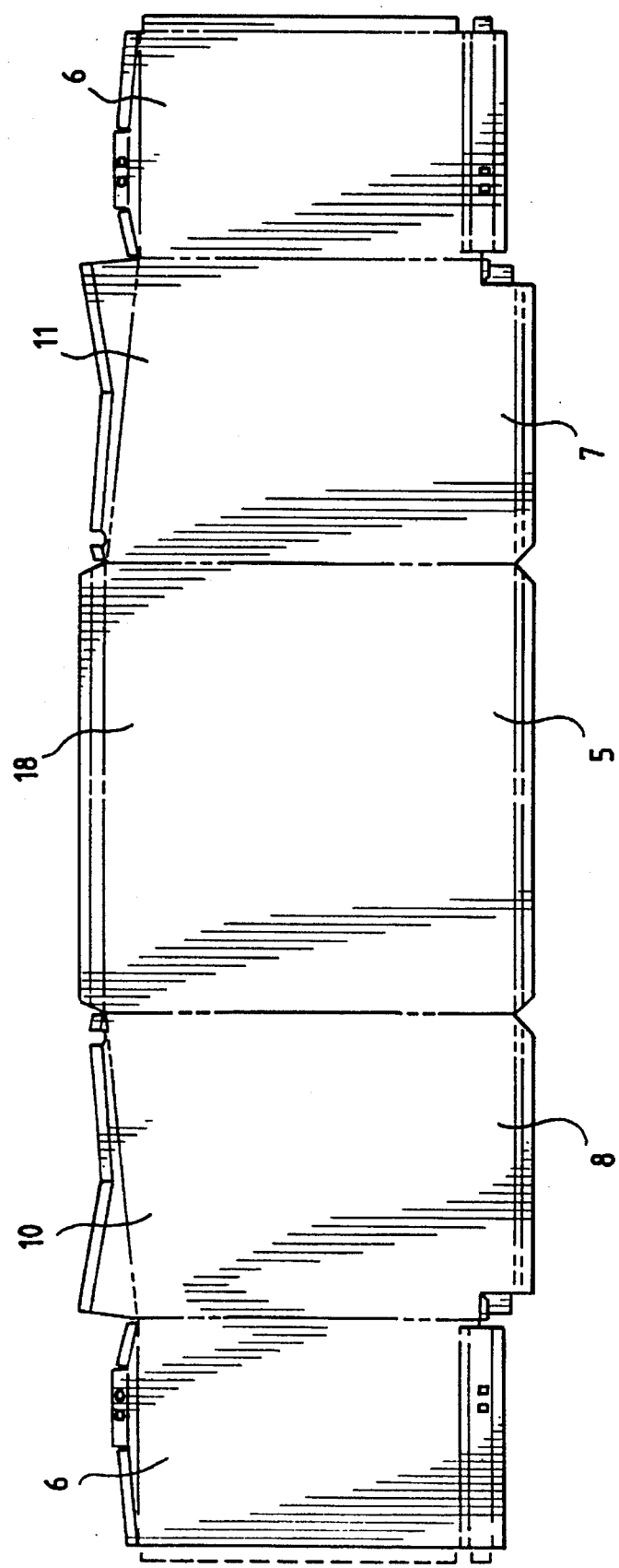
FIG. 44 is a plan view of a blank for forming the cabinet of FIG. 4.

Referring now to FIG. 4, in the preferred form the present dishwasher cabinet is constructed from sheet metal to form a five sided box structure having a top 5 a bottom 6 and sides 7 and 8 and back (not shown). The top 5, sides 7, 8 and bottom 6 are cut as a unitary blank, from a sheet material, for example sheet steel, as shown in FIG. 44. The blank is then folded, (1) along two fold lines to form lipped internally directed flanges on the front and rear edges and (2) to form a four sided box with the bottom 6 being made up of two half-width panels which lap at a central seam. The back panel (not shown) is fastened to the rear edge flanges of the top, sides and bottom, and the bottom seam fastened with rivets, screws or welds. The front edge flanges on the top and sides are configured as a portal frame having two tapered L-shaped portal members or beams 10 and 11, the flanges forming the portal members decreasing in depth from the corners 12 and 13 to the extremities 14 and 15 and decreasing along the bottom face to a central joint 16. The depth and rigid fastening of the flanges at corners 13 and 13 ensure these corners are resistant to moments acting about the joints. This enables an adequate sized opening to be provided in the cabinet while at the same time provides adequate stiffness to the front of the cabinet. This technique overcomes the rigidity problem presented by any open sided box structure and could be used in many applications beside dishwasher cabinets. The portal frame member 10 and 11 are jointed together at 16 by a very thin section of metal which in structural terms comprises essentially a pin joint, in contrast to the rigid joints provided at the corners 12 and 13. Similarly, ends 14 and 15 of the portal members are effectively joined to flange section 18 by pin joints. This section effectively forms a beam to tie together the ends of the portal members. Unlike the conventional application for portal frames joint 16 is not subjected to any significant load normal to panel 6. The function of the portal frame in the present application is to provide bracing against transverse or racking loads and there is no requirement or advantage in having joint 16 moment resisting.

The portal could be inverted but the orientation shown assists in allowing clearance for a wash chamber drain pump (to be described later) due to the reduced flange depth at joint 16.

Drawer and Connections to Wash System

Figure 5:
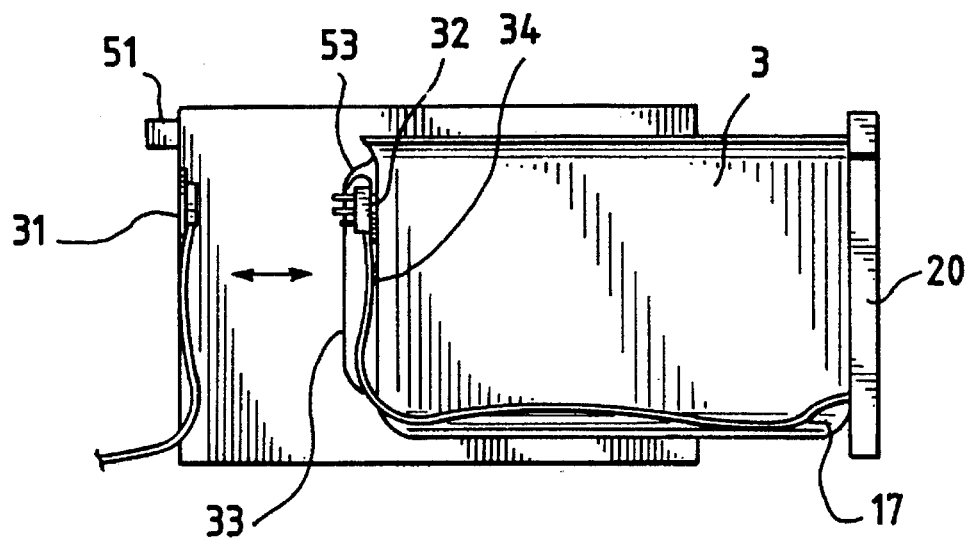
FIG. 5 is a diagrammatic cross section of one embodiment of a dishwasher according to the invention showing a wash system partially withdrawn from its cabinet.

One aspect of the present invention is that a dishwasher is provided whereby the wash chamber in which dishes are placed, together with all other components necessary to the wash system, is mounted within a cabinet on slides to function as a drawer. This configuration is shown in FIG. 5 where a wash chamber 3 is shown slidably mounted within cabinet 4 in a partially withdrawn position.

Figure 6:
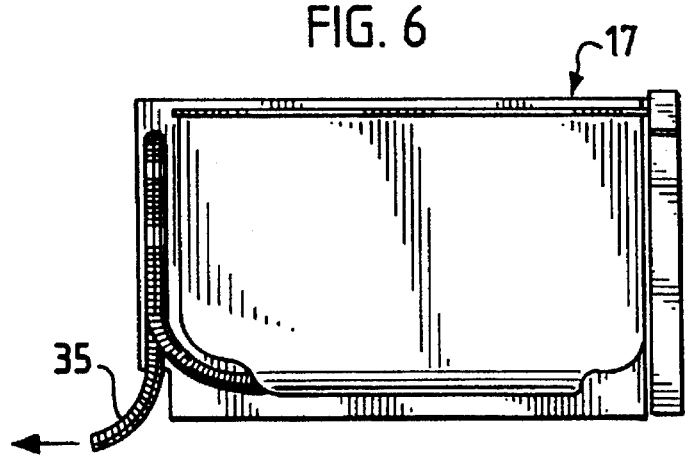
FIGS. 6 to 8 show the dishwasher of FIG. 5 between full retraction and full withdrawal and in particular show the wash system drain hose extension.

An aesthetically pleasing facia 20 is fitted to the front of washer chamber 3 and incorporates a drawer pull (not shown). When fully retracted or closed (as shown in FIG. 6) facia 20 abuts the front of the cabinet 3.

A dishwasher as described is intended for installation in an open cavity, usually under a bench, so that the facia 20 effectively closes off the cavity and is the visible component of the dishwasher in the same manner as with conventional front loading dishwashers.

Unlike the cabinet wash chamber 3 preferably formed as a one piece plastics moulding. This has obvious advantages over sheet metal fabrication.

Figure 7:
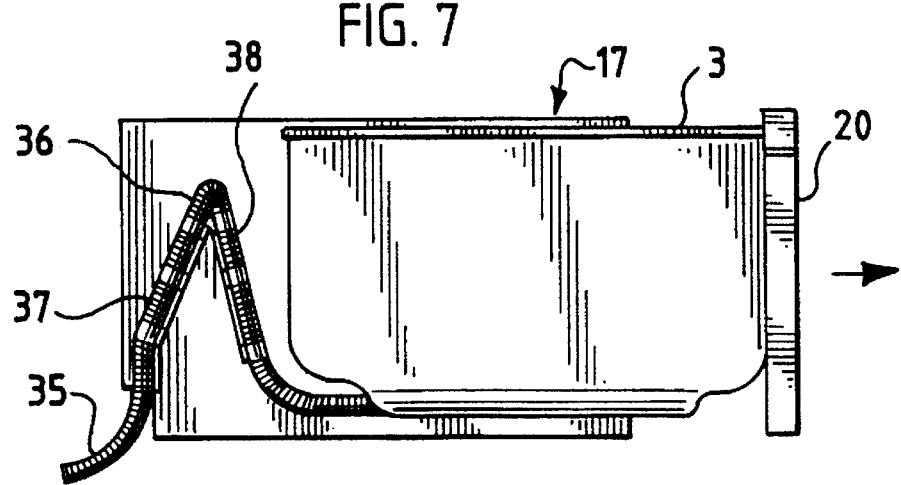
Figure 8:
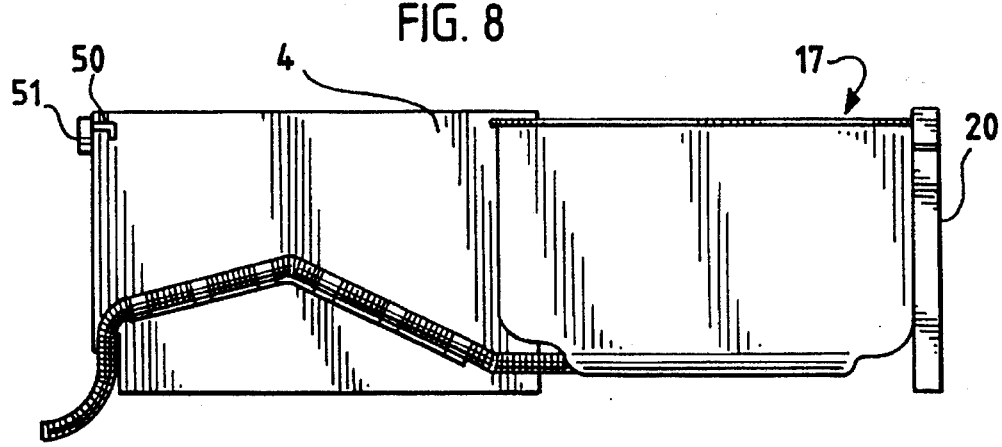

The use of a drawer configuration means that flexible and extending cable and hose arrangements are required for running between the cabinet and the wash system. Electrical connections for the drawer mounted components could be provided by a socket 31 attached to the cabinet and a plug 32 attached to the washing chamber. Connection is made when the drawer 17 is in the substantially fully home position. Preferably, however, fixed wiring is employed using a flexible cable loop. In this form the electrical cable could be attached compositely to the drain hose shown in FIGS. 6 to 8.

Water connections to and from the sliding washing chamber 3 are arranged as follows. A drain hose 35 (FIGS. 6 to 8) is formed in a loop and is arranged to have a central portion 36 transverse to the direction of movement of the chamber with two arms 37 and 38 connected to the central portion. As may be seen by comparing FIGS. 6, 7 and 8, the drain hose arms 37 and 38 bend where they are connected to central portion 36 so that the two arms move from a position in substantially the same plane (orthogonal angles to the direction of movement of the drawer 17) as shown in FIG. 6 to the position shown in FIG. 8 where the two arms are more or less in the same plane but at right angles to the position shown in FIG. 6. This arrangement minimises the space required to accommodate the drainage hose when the wash chamber is in the closed position.

Figure 9:
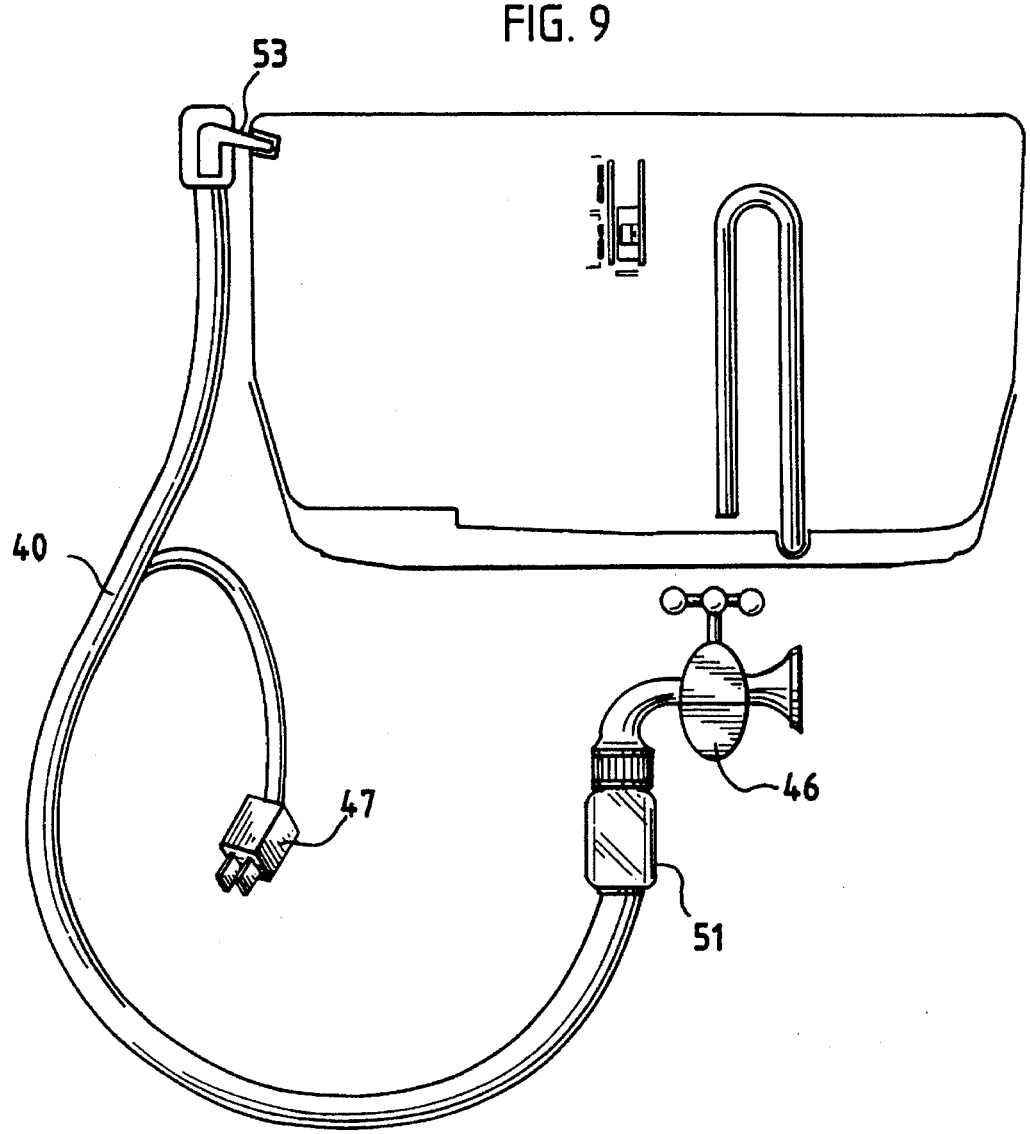
FIG. 9 is a diagrammatic sketch of the water supply system for a single dishwasher module.

The water supply management for the wash system is shown in FIG. 9. A wash hose 40 connectes between a discharge spout 53 and an electrically operated water valve 51. Valve 51 could be a solenoid valve, for example. Valve 51 is in use coupled to a household wash supply tap 46. The valve 51 is moulded to the hose 40. In addition an electrical cable is also moulded to hose 40 to provide an electrical connection to valve 41. The electrical connector 47 is attached to a cable tail 47 allowing connection to the dishwasher controller through a cabinet mounted socket.

Water Reservoir Tank

Figure 10:
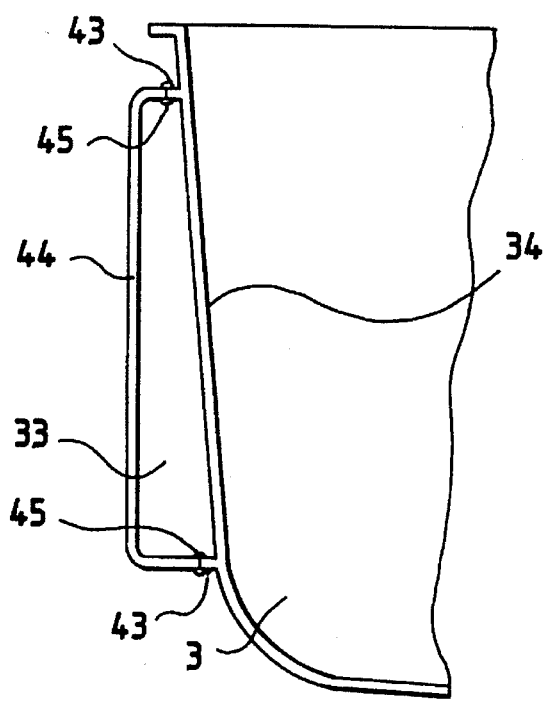
FIG. 10 is a diagrammatic longitudinal cross section at the rear of the wash chamber showing a reservoir tank having a common wall with the wash chamber.

Wash water is supplied to a reservoir tank 33 which is partially integrally formed with the wash chamber 3 (see FIG. 10). The chamber 3 has a closed flange on one end wash. A moulded plastics cover member 44 is welded to the flange dry line for form the tank 33. The tank 33 share a common wall 34 with the wash chamber. The use of a separate tank of much smaller horizontal cross section than that of the wash chamber 3 allows accurate metering of the volume of water used for washing. This is especially important where, as here, a relatively small change of water is used—typically 2 liters.

Figure 18:
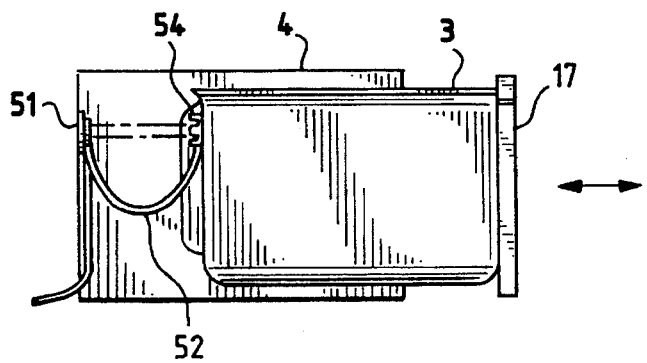

The manner in which the reservoir tank 33 is used to meter water into the wash chamber will now be described with reference to FIGS. 11 and 13 to 15. The water supply hose 40 is shown connected to electrically actuated inlet valve 51 fed from a supply of cold water. The water supply hose terminates at a spout 53 fixed to the cabinet 4. Spout 53 discharges into tank 33 only when wash chamber 3 is in the closed position. Alternatively a flexible hose 52 (FIG. 18) may be connected from the cabinet 4 to a spout 54 fixed to the tank 33. In either case inlet valve 51 cannot be opened unless the wash chamber 3 is in the closed position. An interlock switch can be provided to accomplish this or the electrical connection broken in the manner discussed above in relation to FIG. 5.

Figure 14:
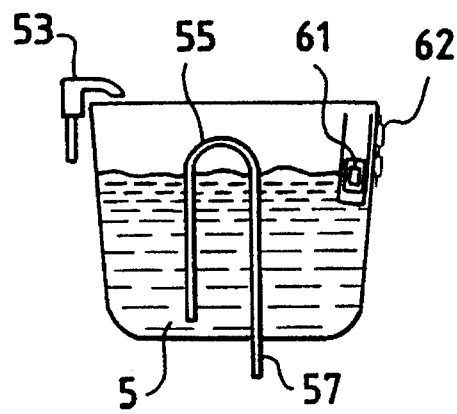
Figure 15:
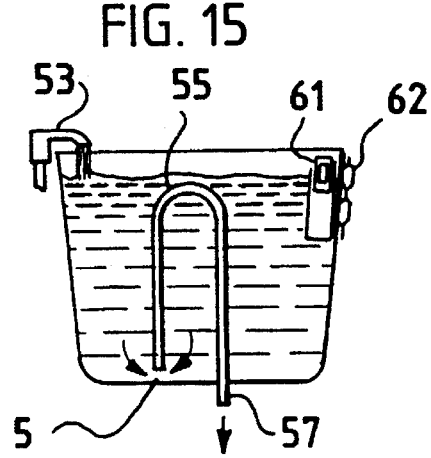
Figure 16:
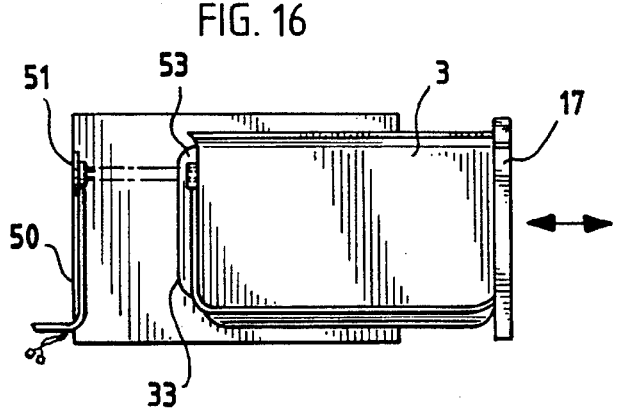
FIGS. 16 to 28 show diagrammatically longitudinal cross-sections of the dishwasher illustrating alternative filling configurations.
Figure 17:
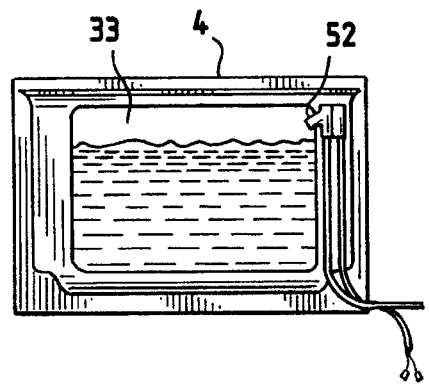

Control of the filling of tank 33 is determined by a water level sensing means 60 having a permanent magnet in a float 61 which is able to activate reed switches 62 and 63. Inlet valve 51 is opened and the tank is filled to a level such that the float 61 rises and activates the lowest level reed switch 62 to cause the inlet valve 51 to be closed as indicated in FIG. 14. Water is held in tank 33 for a variety of purposes which will be described, but when required discharge into the wash chamber 3 occurs as follows. Inlet valve 51 is again opened to raise the water level to a level just above the top of the loop of a syphon tube 55 whereupon syphonic action occurs causing the entire contents of the tank to be dumped into the wash chamber 3 through syphon tube outlet 57. Upper reed switch 63 senses when the water level rises above the top of syphon tube 55 and the inlet valve 51 is then closed. The flow rate of the water through valve 51 must exceed the symphon flow rate for switch 63 to the triggered.

Alternative methods may be used to switch valve 51 off as soon as syphoning occurs. A sensing means can be included in the discharge leg of the syphon 55. Alternatively reed switch 63 can be located below the level at which syphoning occurs and the time taken to increase water level from reed switch 62 to reed switch 63 used to calculate flow rate of the water supply. A further calculation can be made to determine the additional time required for the water level to reach that required for syphoning. Inlet valve 51 can be switched off after expiration of this calculated period of time.

Figure 11:
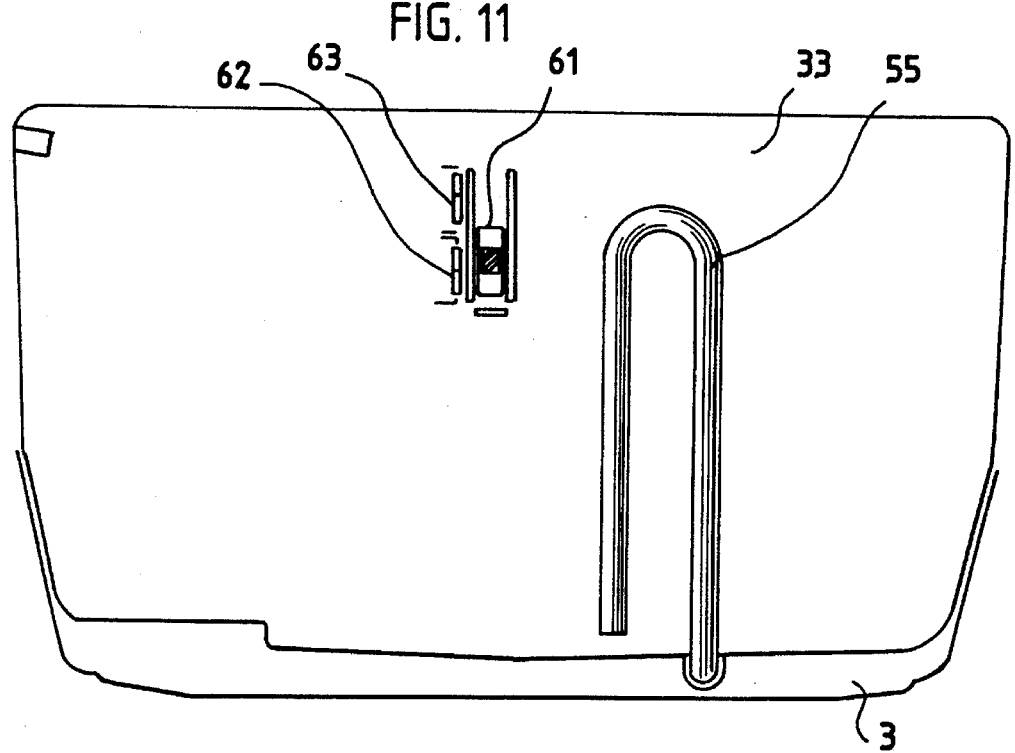
FIG. 11 is a diagrammatic transverse cross section through the reservoir tank.

Tank 33 shares a common wall 34 with wash chamber 3 as is best seen in FIG. 11. This wall is thermally conductive and constitutes a heat exchanger between the wash chamber and reservoir tank. The plastics material used for the wash chamber may itself be sufficiently conductive to obtain adequate heat transfer or alternatively a metal wall insert can be fitted. When tank 33 is filled prior to use for washing or hot rising the water will be pre-heated due to heat transfer from the heated water and interior of the wash chamber. On the other hand the cold water in the tank will tend to keep wall 34 cooler than it would otherwise be and this phenomenon is used during the drying cycles as described later.

In summary the reservoir tank 33 configuration provides:

(a) a container in which the inlet water volume can be measured above, (b) a means of cooling a surface of the wash cavity so that the steam air inside the wash cavity, at the completion of a wash programme, can condense and thereby allow the wash load to dry, (c) a heat exchange so that the incoming volume of inlet water can be pre-heated prior to entering the wash chamber to thereby remove the risk of thermal shock to the washload if it is at an elevated temperature, and (d) reduced heat up time when the liquid is transferred to the wash chamber and pre-heating occurs while the wash system is operating to thereby reduce energy usage.

Figure 40:
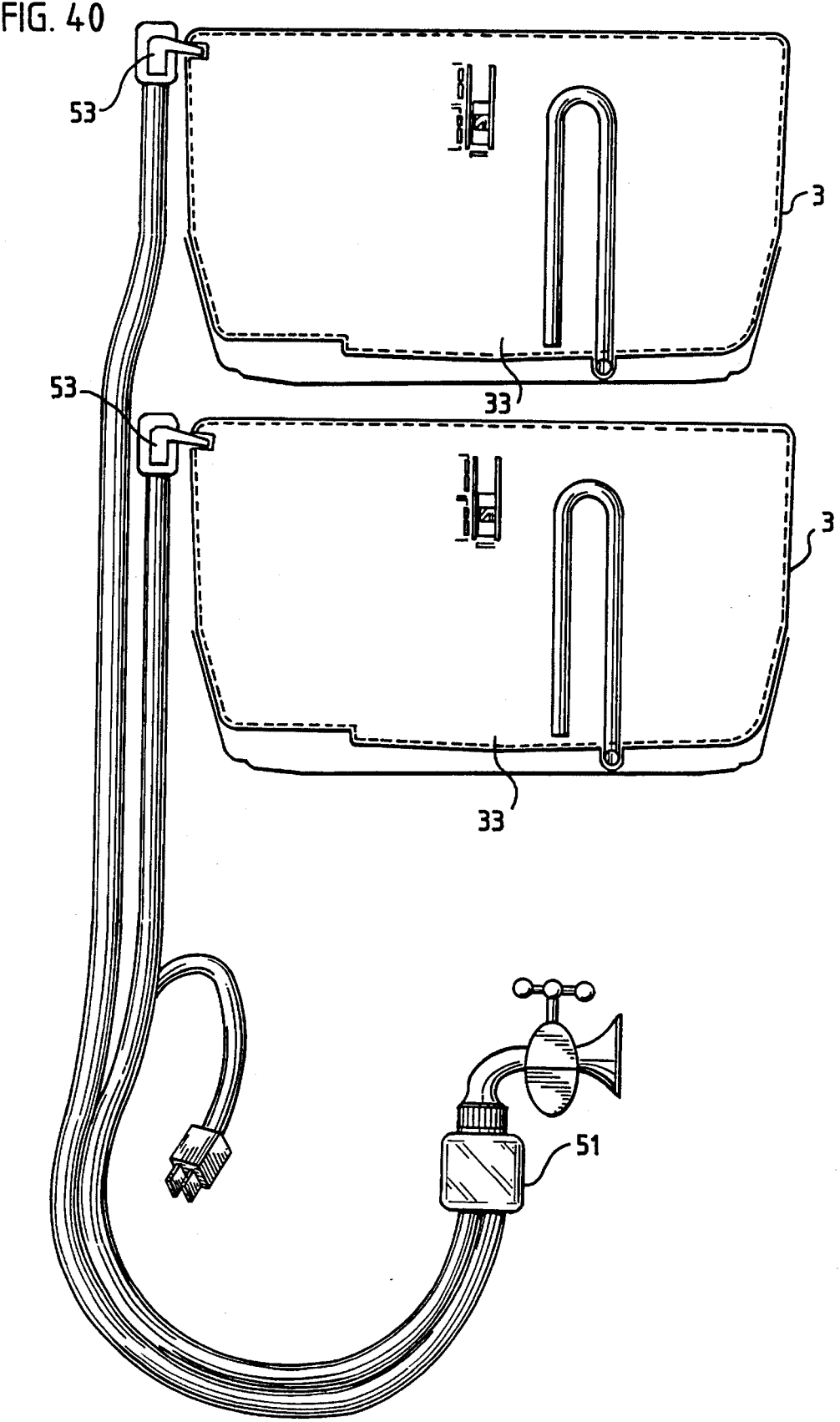
FIGS. 40 and 41 show diagrammatically two options for water hose connections two modular dishwashers forming a composite pair.
Figure 41:
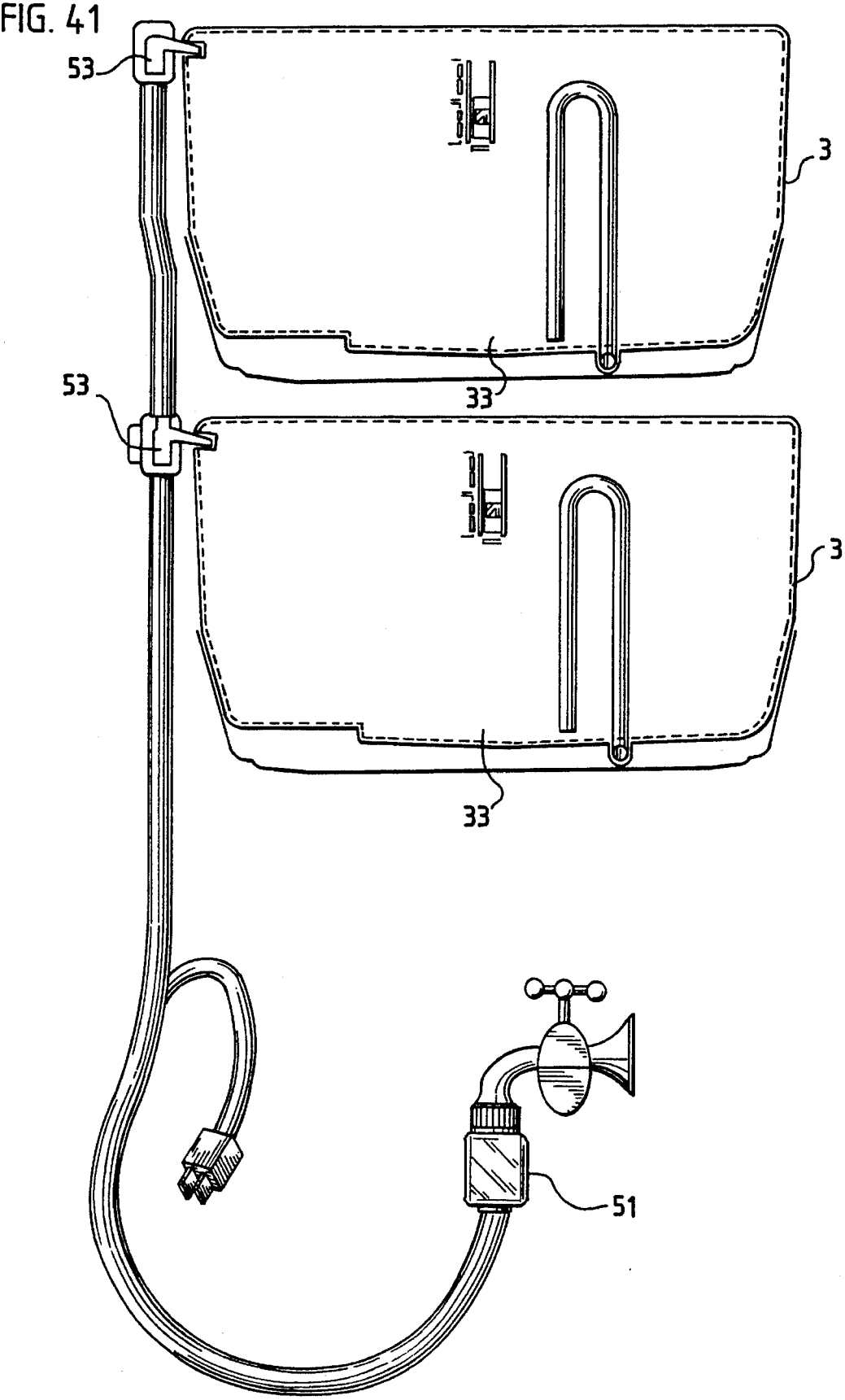

Plumbing refer to FIGS. 40 and 41

When two dishwashers are used in combination in the manner previously outlined they are nevertheless plumbed so as to share household fittings during installation. Two alternative methods of providing water supply are shown in FIGS. 40 and 41 respectively. In FIG. 40 each dishwasher water supply hose 40 is terminated on a respective outlet of a dual valve 51 which is coupled to a cold water tap. Each section of the valve is controlled separately by respective controls in the two dishwashers. In FIG. 41 the water hose 40 for the top dishwasher is connected to a two-way or shuttle valve 48 which also supplies water to the spout 53 of the lower dishwasher. Valve 48 receives water from valve 51. Valve 48 operates to divert water between the top and bottom washers.

Wash Chamber Lid

Figure 19:
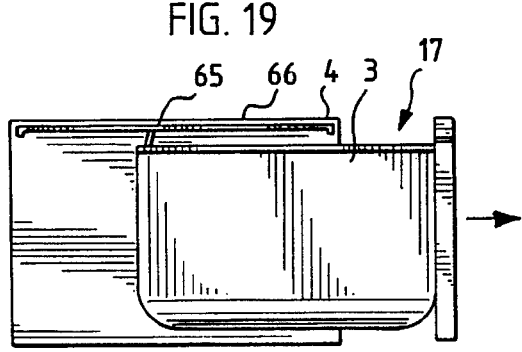
Figure 20:
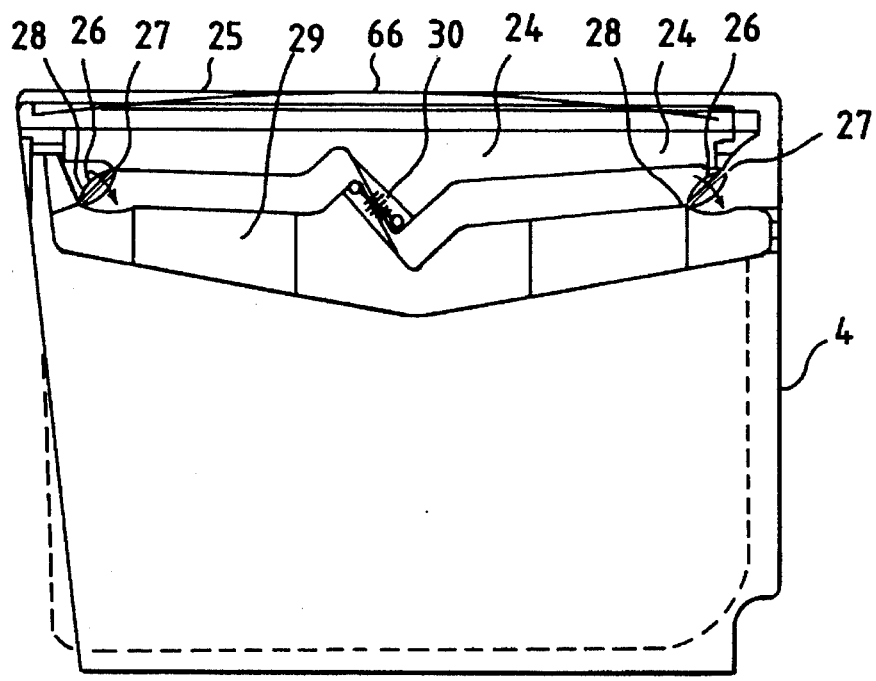

Because in the preferred form of the invention wash chambers 3 (and associated wash system) is arranged as a sliding drawer 17 (see FIG. 19) dishes are top loaded and a watertight lid 66 provided. Lid 66 is mounted in cabinet 4 rather than the wash chamber 3 and engages with the top of the wash chamber only when the drawer 17 is fully closed. Thus when the drawer is withdrawn the lid is left in the cabinet. The user has no direct involvement with opening and closing the lid. A lid lifting mechanism is provided to raise and lower the lid as the drawer is opened and closed, and to lock the lid down in place with the drawer is fully closed.

Figure 21:
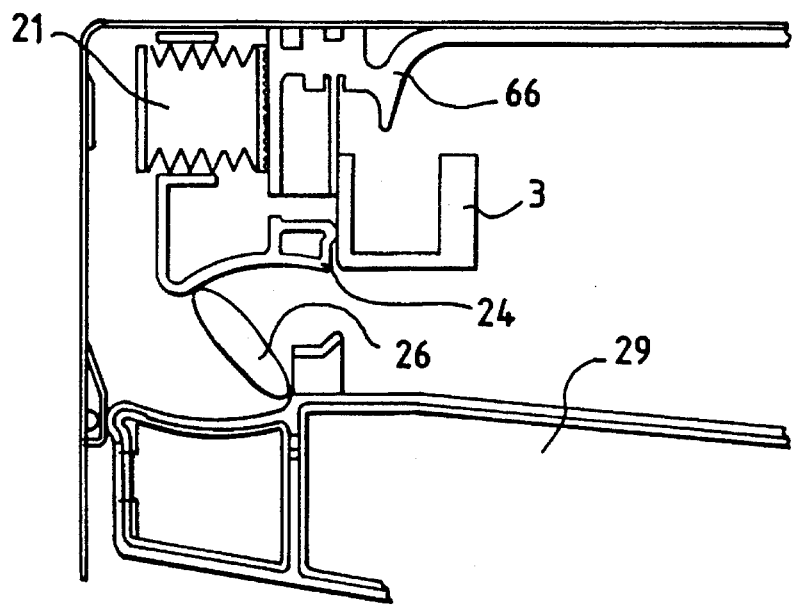
Figure 22:
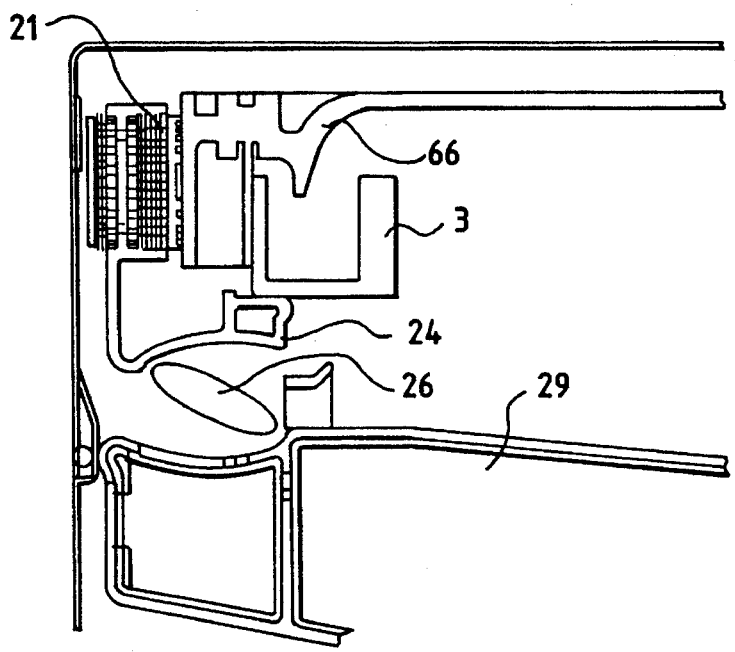
Figure 23:
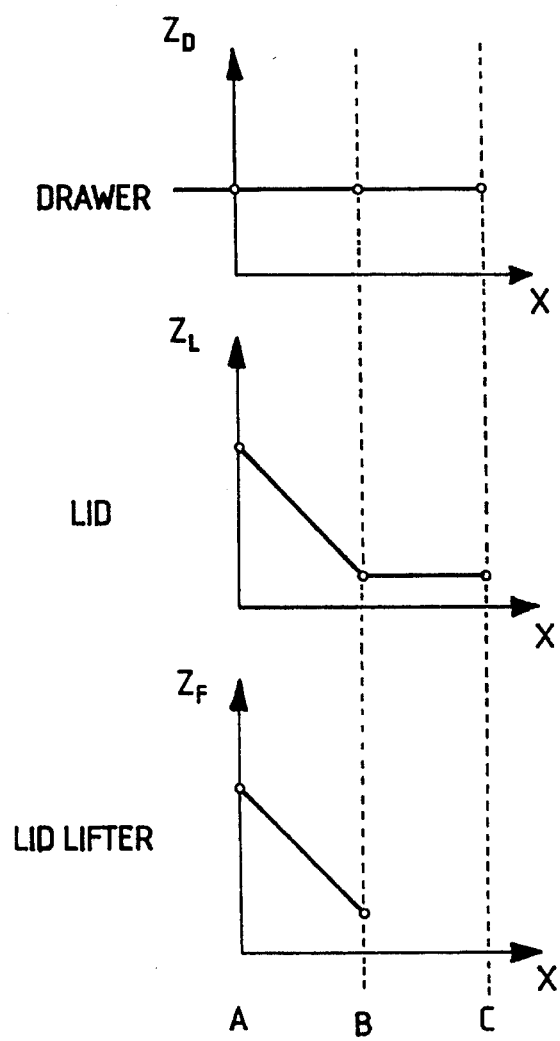

The lifting mechanism includes a sub frame 24 mounted by four link members 26 hinged at 27 to the sub frame 24 and hinged at 28 to a frame member 29 forming part of the cabinet 4. The links and hinges are preferably formed as a unitary moulded polypropylene or "living" hinge. Lid 66 is floatably retained by the sub-frame 24A tension spring 30 biases the sub frame 24 and lid upwardly to a position in which the lid 66 is lifted away from the to of wash chamber 3. FIG. 21 shows the chamber 3 almost fully retracted at the point of lid closure. An abutment flange on chamber 3 (moving to the left) has made contact with lid 66 and contact with a portion of lid lifter 24. Further leftward movement of chamber 3 will cause lifter sub-frame 24 to rotate link 27 anti-clockwise, moving the sub-frame and lid both inwardly (to the left) and downwards. The relative displacements of the chamber (drawer), lid and lid lifter are shown graphically in FIG. 23. On that graph abutment of the moving parts occurs at point A and further retraction of the chamber to point B results in the lid and lifter moving inwards (increasing value of x) downwards so that the lid clamps onto a top of the open wash chamber. Provision is made for locking the lid in this position. Further reaction of chamber 3 causes the abutment flange to ride up over the abutting portion of sub-frame 24 (which does not move further) and together with the lid 66 (which is free to slide within the sub-frame) moves to point C on the graph, being the physical position shown in FIG. 22. The lid and chamber flange in this "home" position are clamped together. Buffers 21 damp the travel between points B and C.

Wash Chamber Dish Supports

Figure 24:
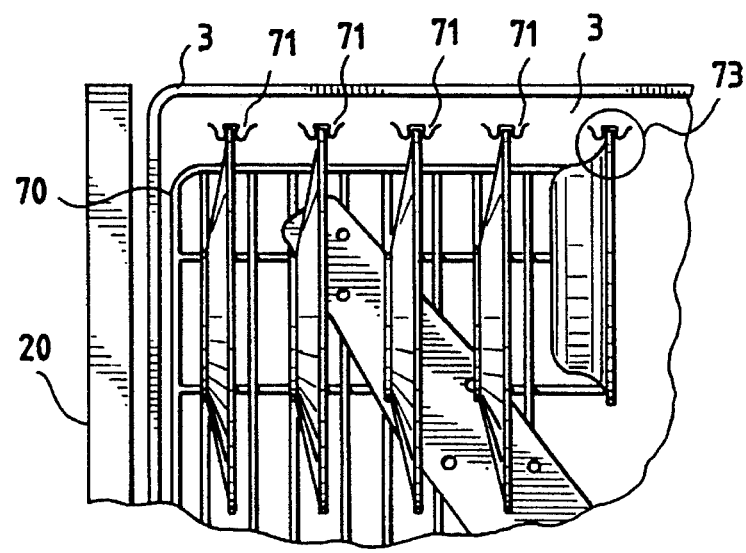

The positioning of dishes in the washing chamber 3 is facilitated by providing a rack 70 on the bottom of the washing chamber. Slots, notches or other details 71 may be provided on at least one side wall of the washing chamber 3 as shown in FIG. 24. These details may be moulded in the washing chamber wall which is preferably a moulding of a plastics material and the arrangement is such that larger dishes for example plates and other dishes having a rim can be supported against the washing forces operating. Preferably a rack providing more conventional dish support may be used to support dishes, although in the present invention such a rack is fixed rather than slidable. However the rack must be configured to optimise the space available in the wash chamber and in this respect must allow the bottom edge of dishes (such as plate 200) to extend below the spray arm hub as shown in FIG. 12.

Wash System Rotating Parts

Figure 12:
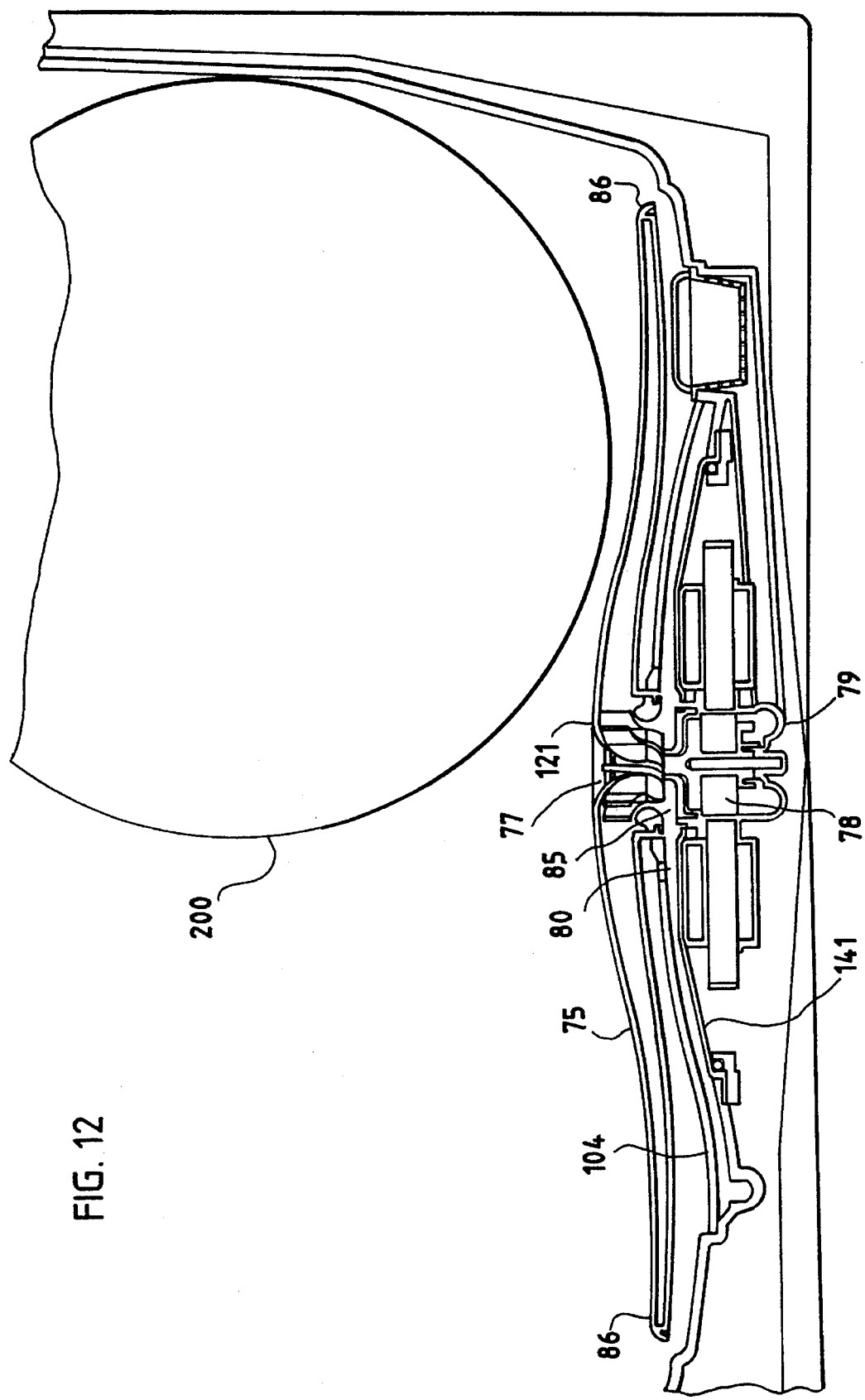
FIG. 12 is a diametrical cross section of the lower part of the wash system showing the spray arm, wash pump, electric motor and drain pump construction.
Figure 13:
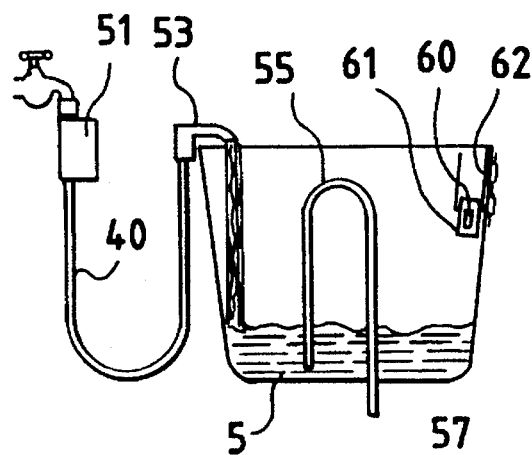
FIGS. 13 to 15 show diagrammatically transverse cross-sections of the dishwasher illustrating the filling and emptying modes for the reservoir tank.
Figure 25:
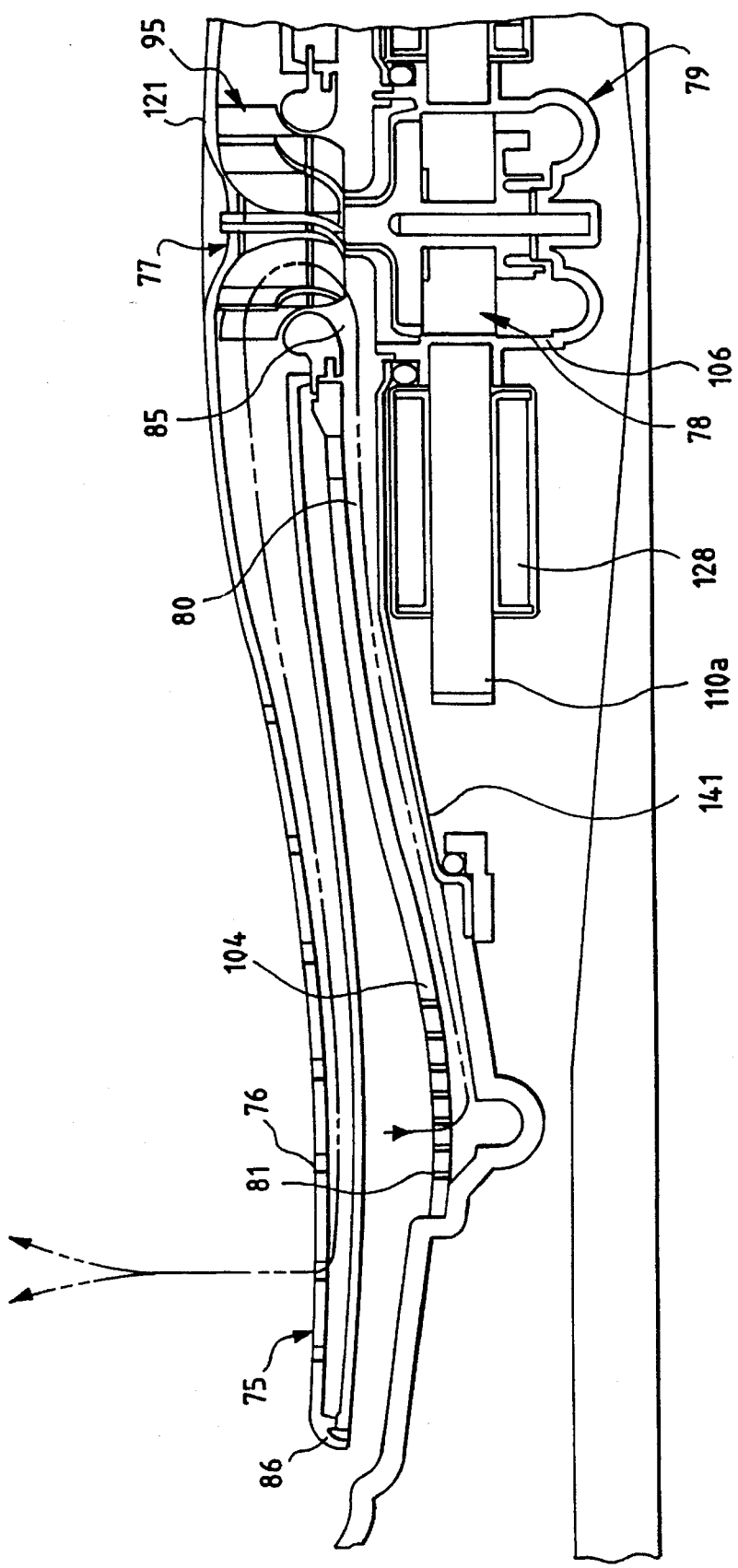

Referring to FIGS. 12 and 25 the washing chamber 3 has a spray arm 75 having spraying apertures or nozzles 76 in an upper surface thereof. A wash/rinse water pump 77 is rotated by an electric motor 78 and preferably this motor also rotates a drain pump 79. The inlet 85 to the wash pump 77 is fed by an annular passageway or plenum 80 under a filter plate 104 having an annular inlet comprising a series of apertures 81 at its periphery. The floor 82 of the wash chamber moulding 3 is recessed to provide the plenum. The spray arm 75 is symmetrically curved as shown with the outer ends 86 curved downwardly from the central or hub portion 121. The purpose of this curvature is so that larger dishes (such as plate 200 shown in FIG. 12) can be accommodated within the low height of the wash chamber 3.

Because of the low volume of water change used for each wash/rinse cycle (2 liters) only a low suction head is available for wash pump 77. This means only a small pressure drop can be tolerated which means the pump velocity intake must be low. To achieve this a large water intake area is required.

As a result of the wash pump requirement for a large intake area, in order to successfully operate with a low liquid volume and a minimal suction head, the height available to incorporate the system that filters the wash liquid prior to it entering the wash pump inlet is reduced as compared with conventional dishwashers.

Figure 36:
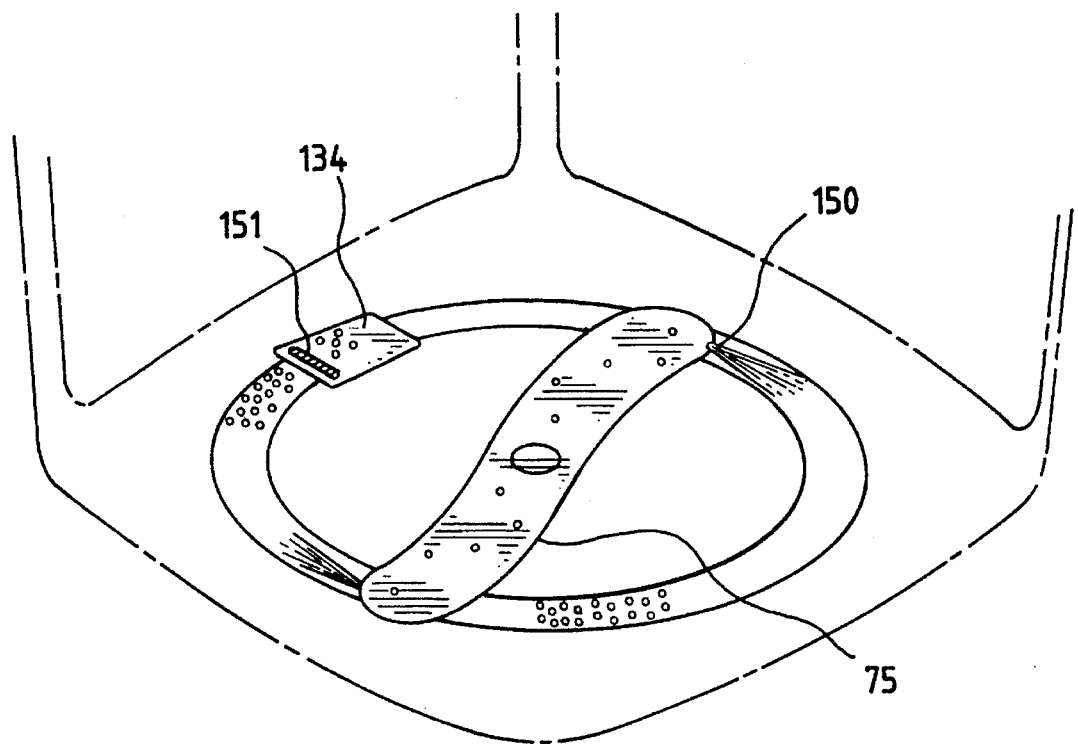
FIG. 36 is a perspective view of the bottom of the wash chamber showing a wash water filter jet cleaning system.
Figure 37:
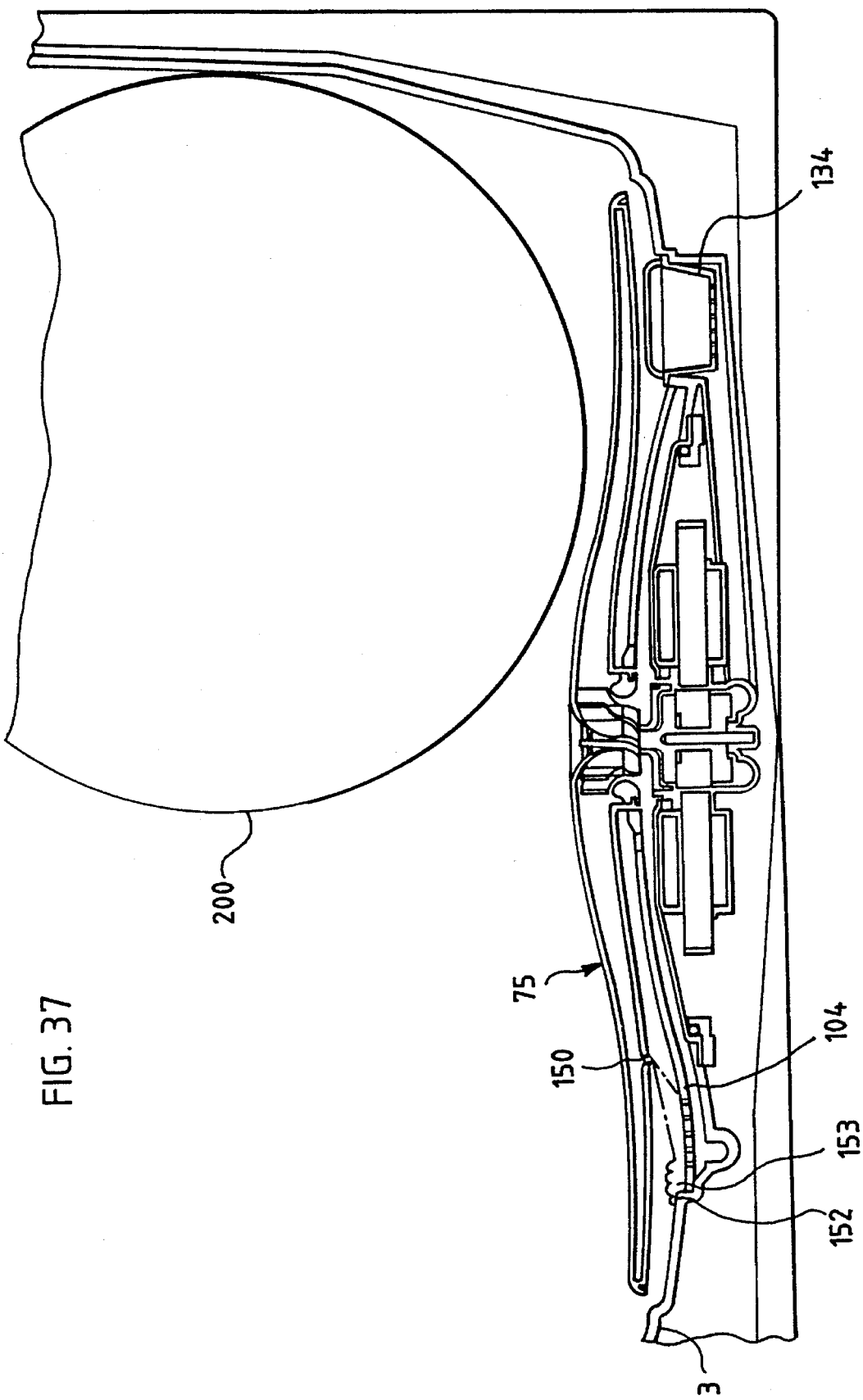
FIG. 37 is a diametrical cross section through the wash system showing the wash filter jet cleaning system.

As already mentioned the intake area is covered with a filter comprising an annular ring of aperture 81 (in filter plate 104) of approximately 350 mm outside diameter and 300 mm inside diameter. To ensure that this perforated area remains as clear as possible for the liquid to flow through, an active filter cleaning system is used. Referring to FIGS. 36 and 37, one or more jets 150 are provided in the spray arm 75 to create a clearing effect on the filter plate 104 ahead of the spray arm as it rotates.

Large soil particles 153 are cleared off the perforations radially onto and against a circular recess 152 and rotated around the filter plate to drain sump 134 which is provided with a passive filter or strainer 151. As with filter systems found in conventional dishwashers, the strainer 151 will require regular servicing by the user. As shown in FIG. 36 the strainer 151 has a "mouth" configuration to scoop in the soil being cleared by jets 150.

Figure 27:
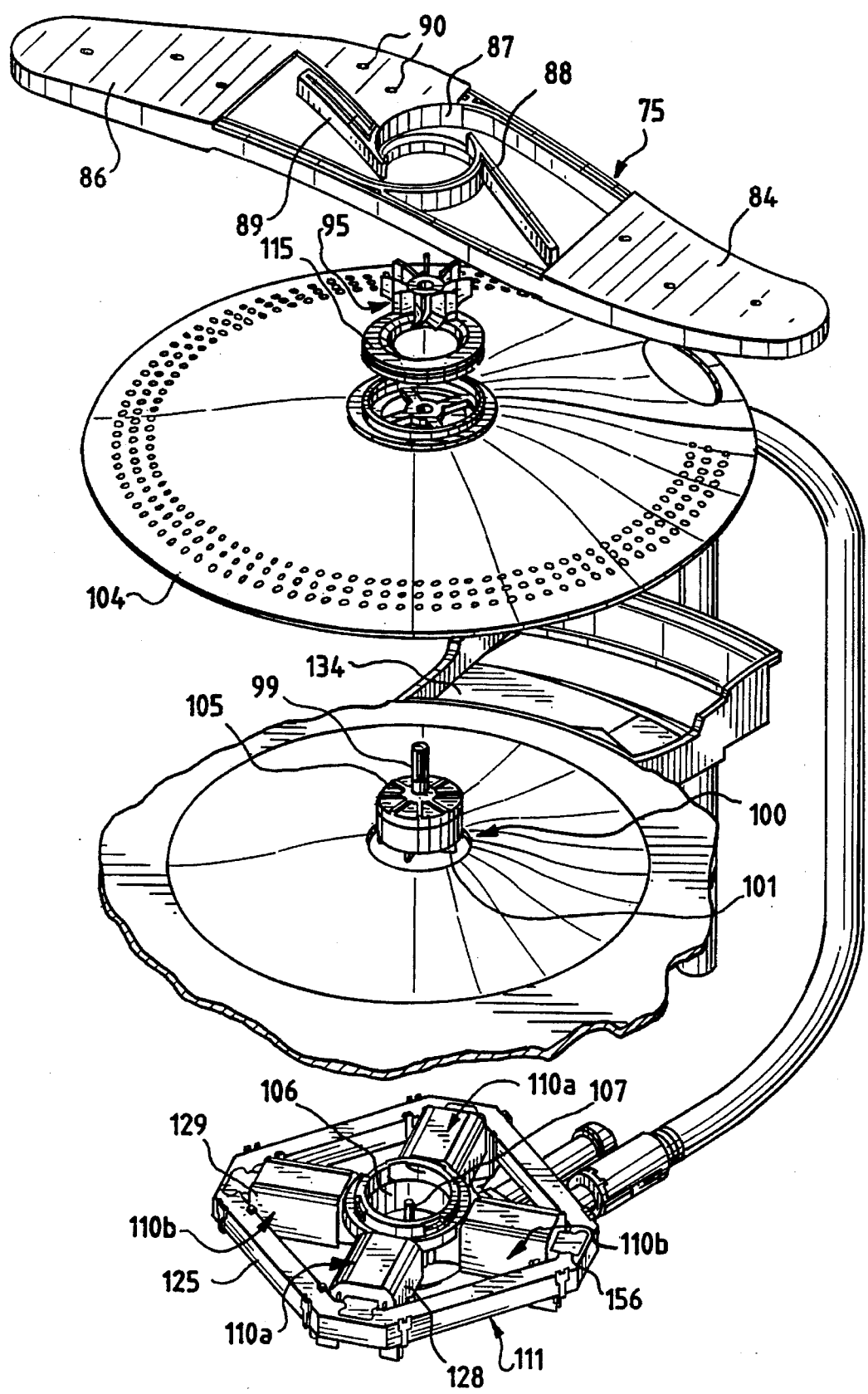

The arrangement of the spray arm, wash pump, motor and drain pump can be understood with reference to FIG. 25 and to the exploded view of FIG. 27. Spray arm 75 integrally includes the wash pump casing 87 which has two delivery volutes 88 and 89 leading to outer sections 84 and 86 of the spray arm respectively. The junctions between the casing 87 and the outlets 88 and 89 are preferably of tangential volute formation as shown in FIG. 27. To ensure wash liquid pressure is available in the inner sections of the spray arm volute surfaces 88 and 89 are stopped short of making contact with the edges of the spray arm. This allows liquid to flow back towards the inner sections to private pressure for nozzles 90 in this section.

Figure 28:
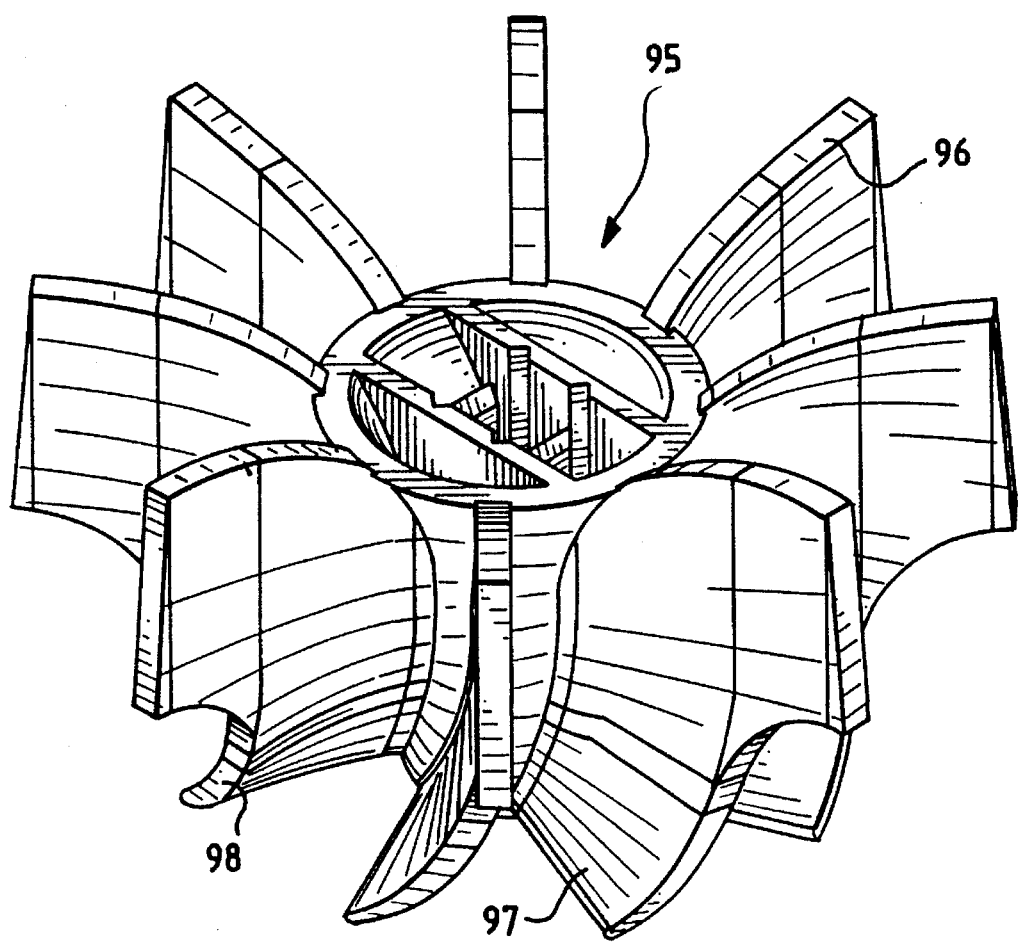

The wash pump impeller 95 (shown in more detail in FIG. 28) has blades 96 curved forwardly at their lower edges. Because in the preferred form the motor 78 is a permanent magnet, synchronous AC motor, it is important that the motor starts under no load conditions. To achieve this the static water level in the wash cavity is set to just touch the bottom of the wash pump impeller. This is indicated by the water level symbols in FIG. 25. However, the centrifugal type pump employed is not self priming. It is for this reason that the impeller 95 has the axial flow type forward facing blade sections 97 on the bottom of the blades. After the motor has started under no load, the leading edges 97 of the impeller lift the liquid and the pump will prime and operate normally. These leading edges 97 also benefit the systems when the motor is rotating in the drain direction (reverse to wash direction). The now backward facing blades resist picking up the liquid and the wash pump cannot operate.

Figure 29:
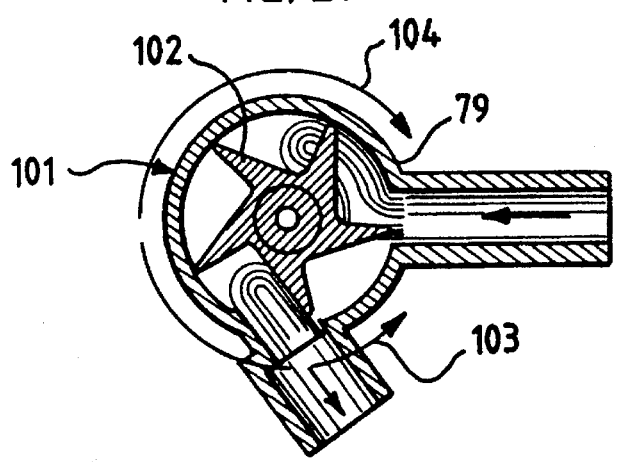
FIG. 29 is an under view of a drain pump impeller.

The motor rotor 100 (FIG. 27) is formed using a ferrite permanent magnet embedded in a plastics casing and has a splined shaft 99 to engage and drive wash pump impeller 95. The motor rotor 100 incorporates on its lower plastics surface also an impeller 101 for the drain pump. A cross section drain pump is shown in FIG. 29. Impeller 101 has blades 102 shaped as shown so that when the motor rotor is rotated in the direction of arrow 103 the drain pump will drain liquid from the washing chamber as will be described more particularly later. When the motor rotor is rotated in the opposite direction (see arrow 104) to operate the wash pump the drain pump is substantially prevented from pumping due to the de-optimised profile of the impeller and casing when rotating in this direction. There is also a non-return valve provided in the drain pump outlet 109 to stop flow being drawn out of the drain hose into the wash chamber.

To prevent water flow by-pass around the rotor and into the wash chamber when the drain pump is working a shallow plastics impeller 105 is formed on the top surface of rotor 100. The eight impeller blades are about 1.5 mm in height. This creates a counter flow in the drain direction. This hydro-dynamic seal acts only against liquid flow by-pass. It does not prevent air bleeding from the drain pump as it primes. It will be appreciated that apart from hygiene reasons drain water back flow would cause abrasion of the rotor and contamination of the spray arm nozzles.

Figure 35:
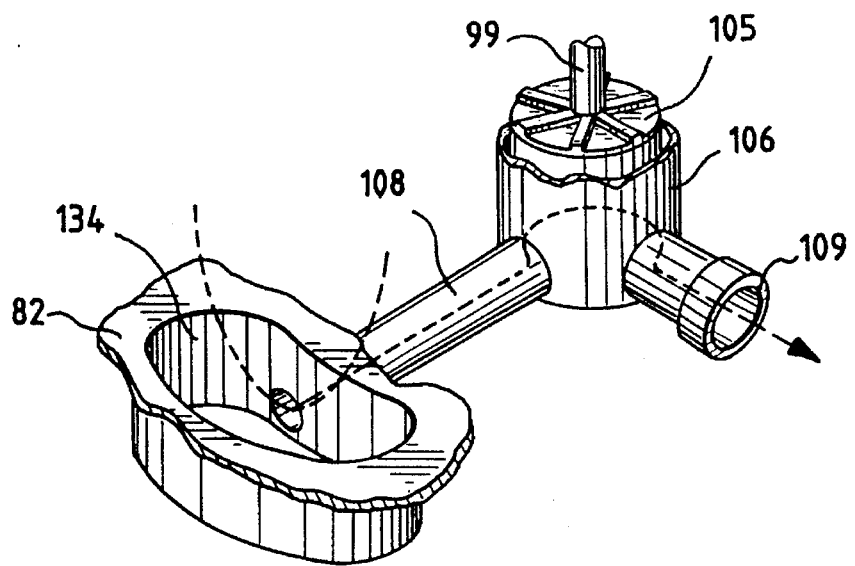
FIG. 35 is a perspective sketch of the drain pump and associated inlet sump.

The drain pump casing 106 (FIGS. 25, 27 and 35) is formed by providing a close tolerance well in the floor of wash chamber 3. It is open at the top to the wash chamber 3. This well could be moulded into the floor or moulded separately and fitted later. The motor rotor 100 mounts within casing 106 on shaft 107. It is a feature of the invention that the motor rotor 100 is located within the wash chamber and submerged in washing liquid. The motor stator 111 (see also FIG. 38) is located outside of the wash chamber and separated from the rotor by drain pump casing 106. The stator in the preferred embodiment comprises four salient poles 110 to make up a two pole pair (110a and 110b) stator. The drain pump casing 106 has a drain pump inlet 108 and a drain pump outlet 109. The arrangement shown in FIGS. 25 and 27 is such that disassembly of the wash system is very simple. The spray arm may be removed simply by lifting it off its bearing 115. The motor rotor 100 and the associated wash pump impeller 96 may be lifted from the well 106 by lifting the filter plate 104. Thus substantially all the working parts can be readily removed to enable cleaning of the drain pump casing 106. No fastenings are needed to retain these components in their working positions. A similar arrangement could be used in appliances other than dishwashers, for example clothes washing machines.

Figure 39:
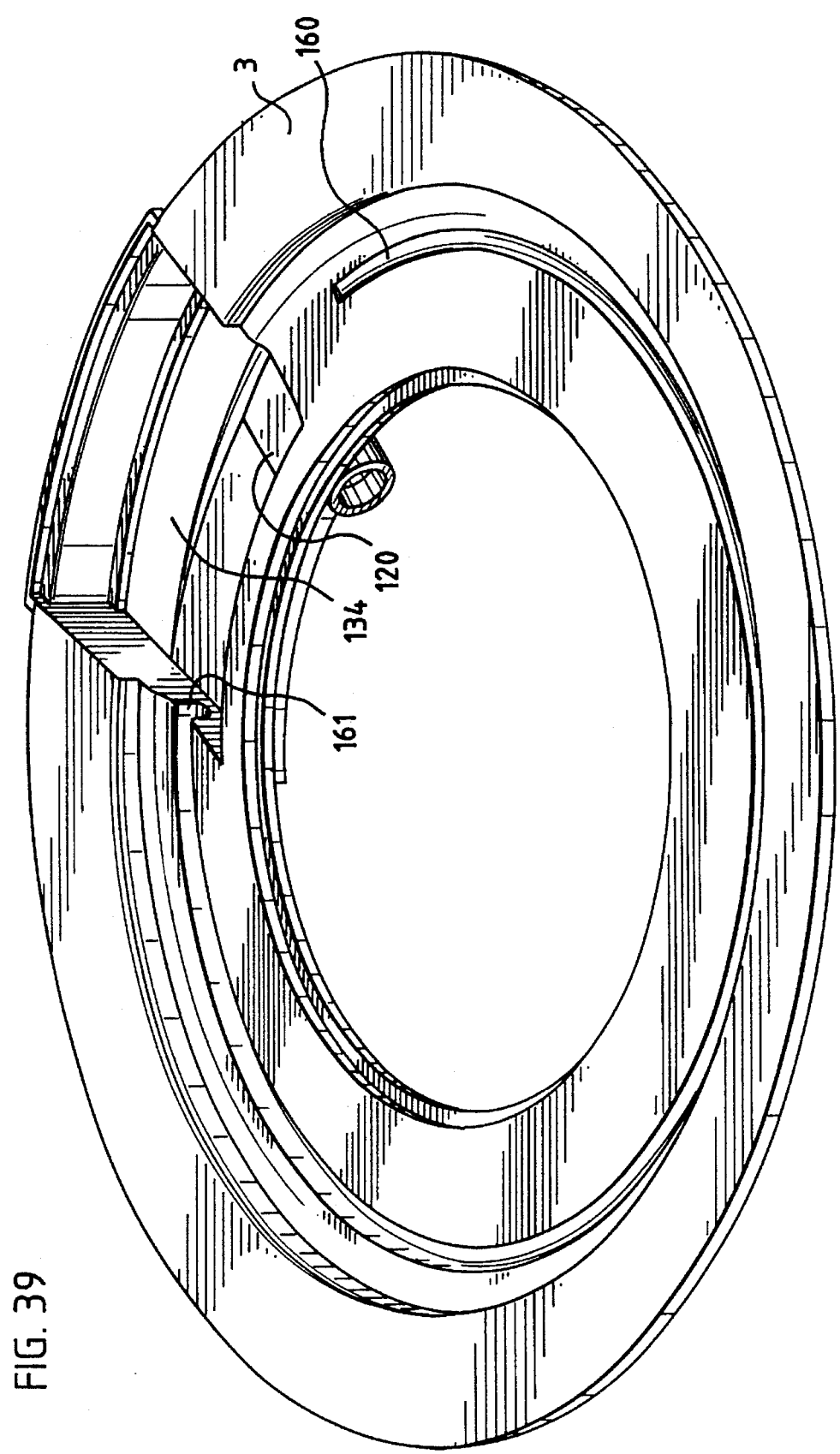
FIG. 39 is a detail of part of the wash chamber floor showing a helical drain channel.

A preferred form of drain sump 134 (shown in FIG. 27 and diagrammatically in FIG. 35) is arranged in the wash chamber base 82 so that substantially all liquid in the washing chamber will drain into it. The drain pump inlet 108 is connected to a lowest part of the sump 120. To further improve wash liquid drainage into sump 134 the floor of the wash chamber is provided under the filter plate with a helical channel 160 having its lowest point 161 opening into the sump 120 as shown in FIG. 39.

It is important to achieve the modular advantages earlier outlined that the construction of the motor-pump combination is such that the height of the wash pump and electric motor from the highest level 121 of the spray arm 75 (FIG. 25) to the lowest level of the electric motor is very small—typically of the order of 55 mm. The height dimension including the drain pump casing extending below the motor is 75 mm.

Figure 30:
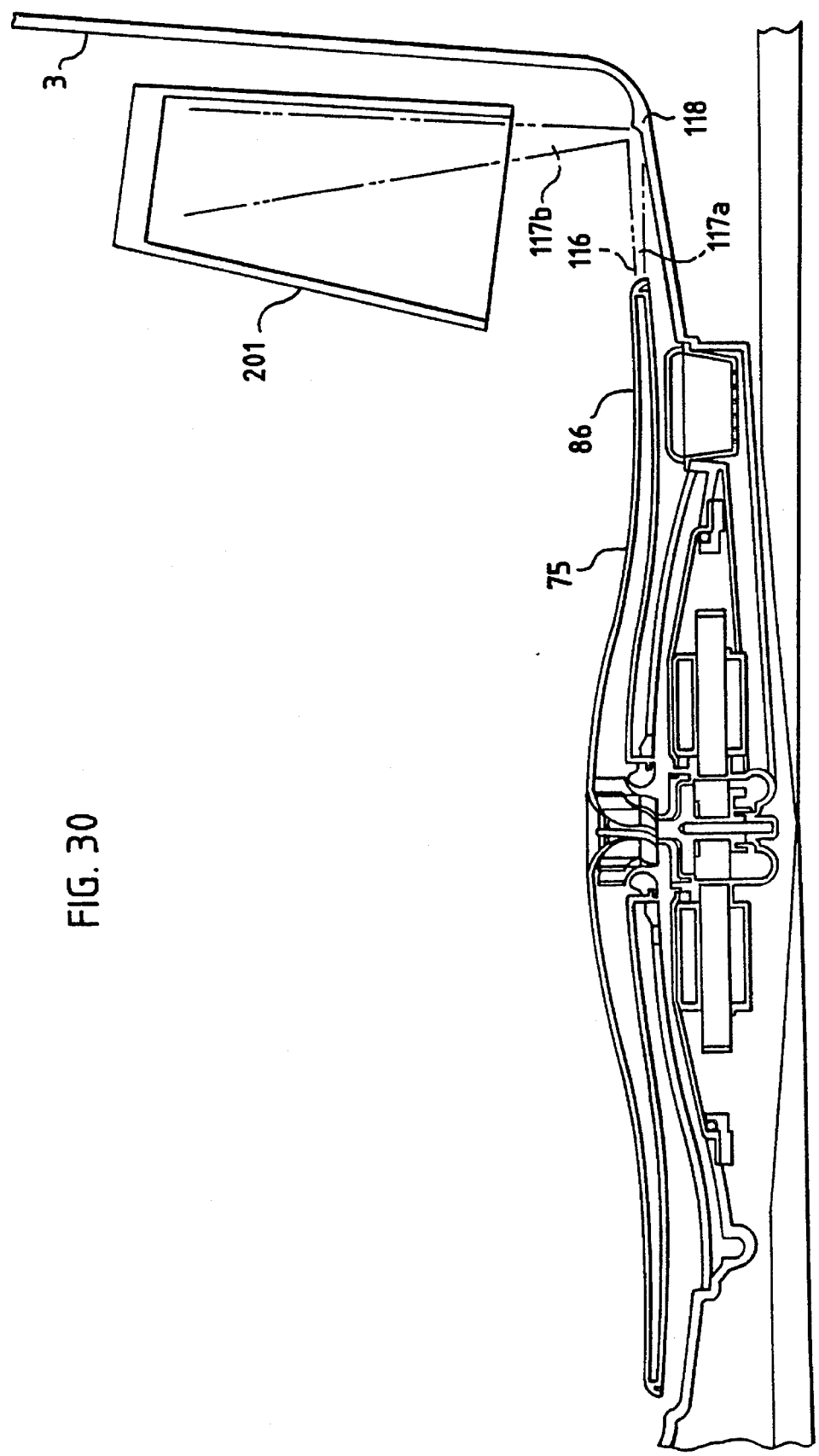
FIG. 30 is a part view of the spray arm and wash chamber wall showing a jet deflecting formation in the corner portion of the wash chamber wall.
Figure 31:
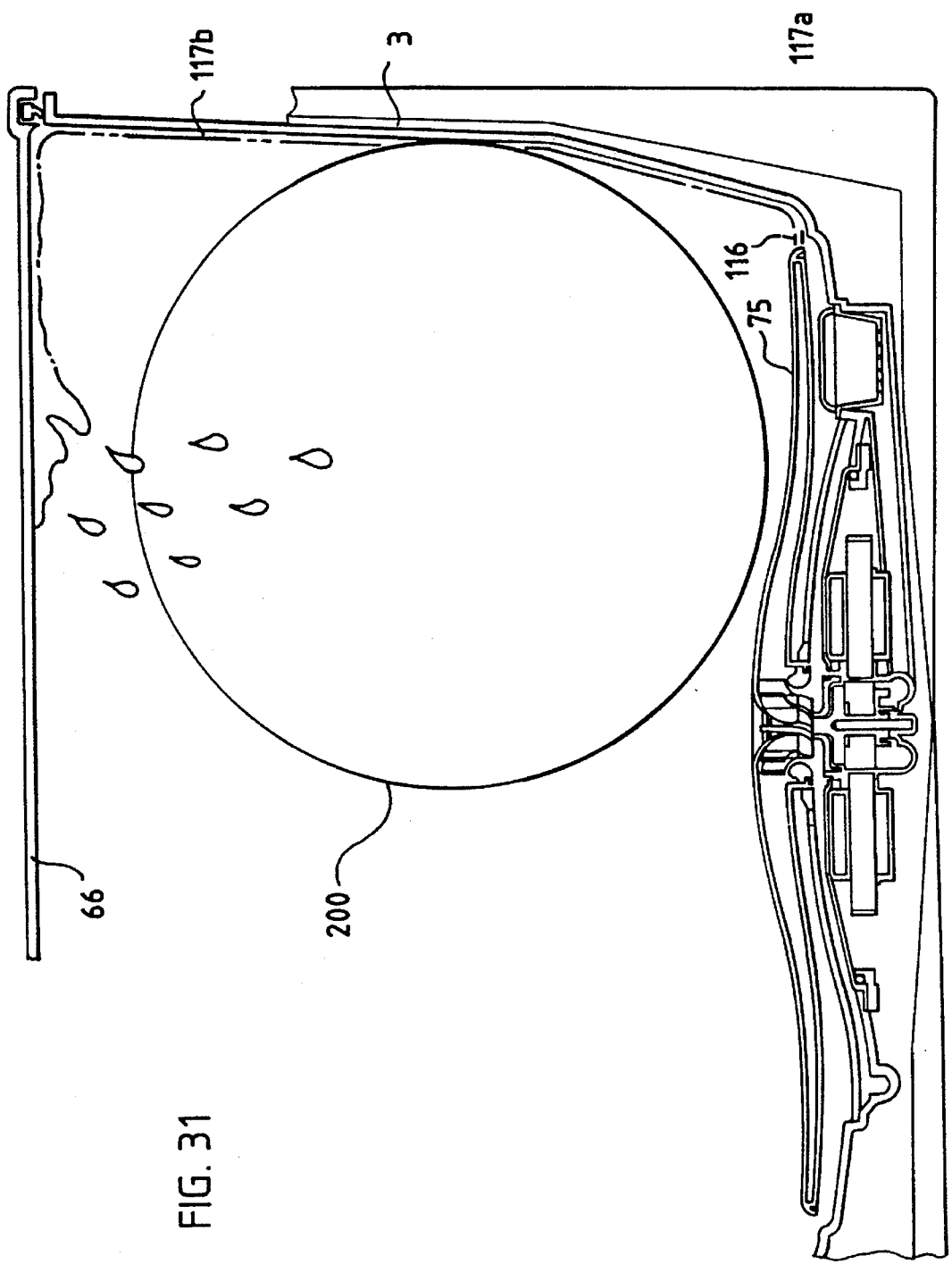
FIG. 31 is a similar view to that shown in FIG. 30 but showing jet deflection from straight portions of the chamber wall.

Referring to FIG. 30, a nozzle 116 may be provided in the ends 86 and 84 of the spray arm 75. This provides a substantially horizontal jet of wash liquid 117a. The corner portions of the wash chamber wall in the plane of the jet have a shaped protuberance 118 to form deflecting vanes to deflect jet spray 117a into a substantially vertical jet 117b. This ensures vertical spray coverage in the chamber corners where rounded corners of only small radius are used well outside the spray arm diameter. In FIG. 30 a glass 201 is shown accommodated in a corner of the wash chamber benefiting from the deflected spray.

Water Heater

The wash cycle requires the use of hot water and it is necessary to provide a heater for heating the cold water supplied to the dishwasher to an elevated temperature.

Figure 34:
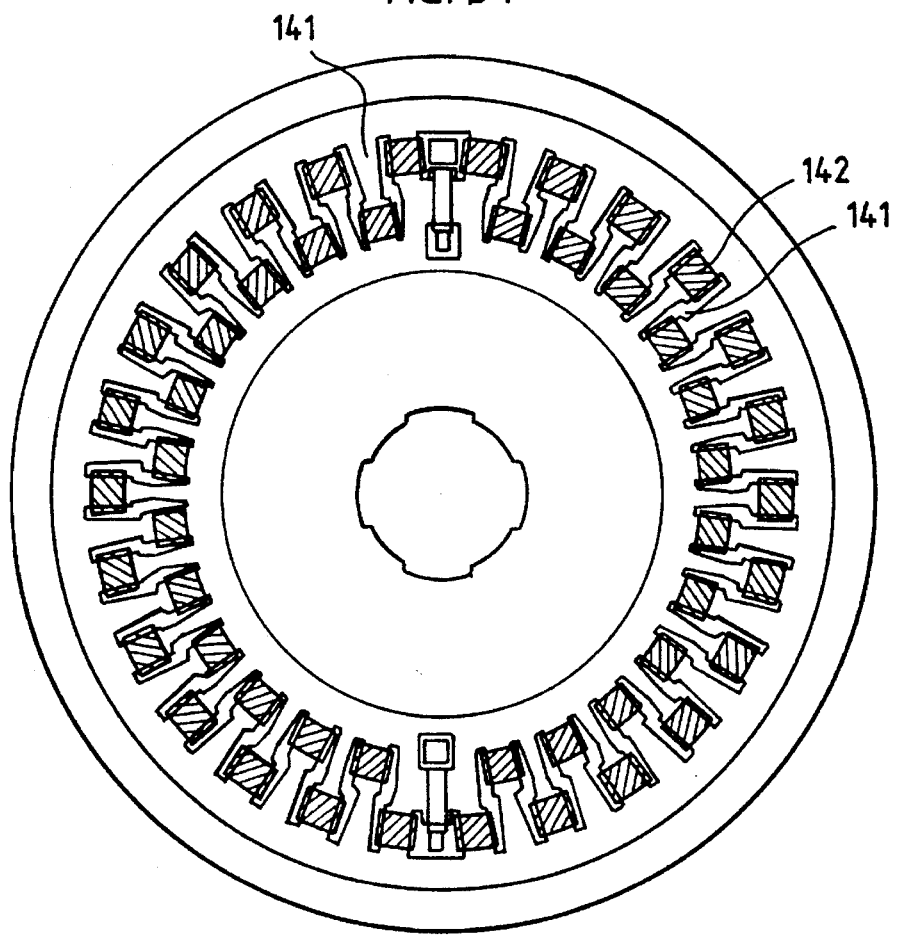
FIG. 34 is a pan view of the underside of a heater plate showing a thick film heating element configuration.

In the present invention the water heater is provided in the floor of the wash chamber as shown diagrammatically in FIGS. 25 and 34. The heater is formed by a circular metal heating plate 141 which has resistive heating elements 142 in intimate thermal contact therewith on the underside. The heating plate 141, which is about 250 mm in diameter, forms the central portion of the wash chamber floor and is sealably mounted in a circular aperture 143 provided in the floor. The heater plate in turn has a central aperture 144 which accommodates well casing 106 which houses the motor rotor 100 and drain pump 101. Seals 145 and 146 respectively seal the heater plate sump and floor junctions.

Heater plate 141 is formed from porcelain enameled steel. A pattern of resistance elements 142 is formed on the enameled lower or exterior surface of the plate. These elements are fabricated using thick film technology where a resistive paste or ink is deposited or printed on the enamel substrate in the desired track pattern and then fused solid. The tracks may be made up of conductive and resistive portions. Power connections to the heater are made to conductive, non-heating portions 147 of the tracks. When energised the resistive tracks dissipate heat which is conducted to the steel plate and thence to the liquid in contact with the opposite surface of the plate. Temperature sensors may also be formed on the plate using thick film techniques to provide feedback for temperature control circuitry. The wash pump loading can also be monitored to provide an indication of flow and the heater switched off on detection of inadequate wash liquid flow. The thick film technology used can also provide thermal oven temperature protection links, inter-connections to the motor, and a termination point for connection to the motor stator windings.

The heater plate provides a relatively large surface area (compared to conventional tubular sheathed elements) for heating the wash liquid which during the wash cycle will flow across the top surface of the plate. A heater of this configuration provides low density heating and low surface temperature which improves safety and minimises the risk of thermal damage to adjacent plastics components.

In the preferred form the heater plate is disposed substantially horizontally in the wash chamber floor which makes it simple to ensure a constant substantially laminar flow of wash liquid is passed over it. However, it would be feasible to mount the heater plate vertically and locate it in one of the side walls of the wash chamber, although not wall 34 which is common to tank 33.

Motor and Motor Drive

Control of the filling, rinsing, draining and washing cycles is provided by a programmed microcomputer 20 (see FIG. 26) for example a National Semiconductor COP881C user operated microprocessor console 126 connects to the microcomputer. The water inlet valve 51 already referred to connect to an output of microcomputer 120.

A primary function of the microcomputer 120 is control of the start up and running of synchronous motor 78, both for washing in one rotational direction and draining in the other direction.

Figure 38:
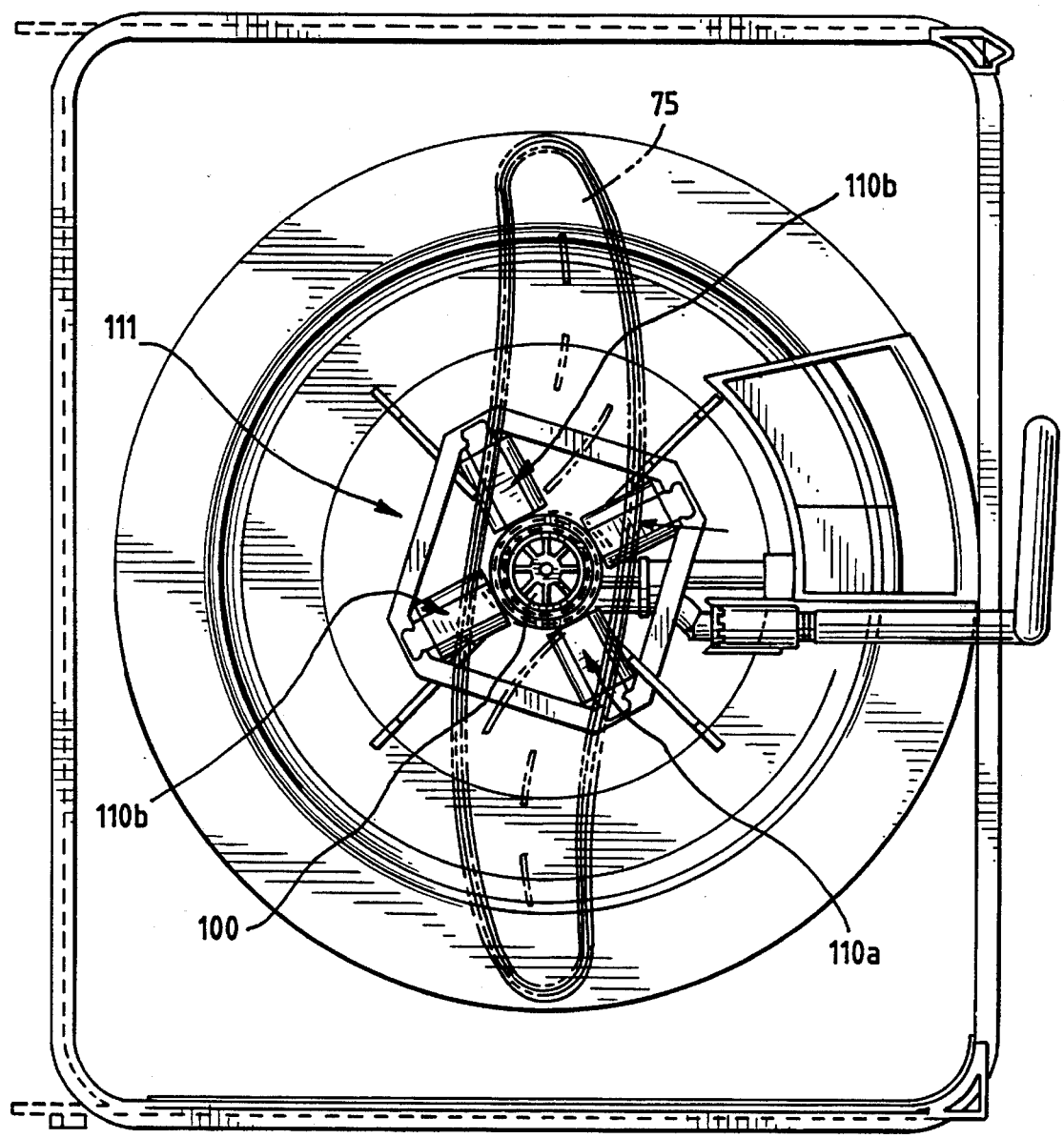
FIG. 38 shows a horizontal cross section through the wash chamber drain so as to show the major wash system components even although they are mounted one above the other and are separated by partitions.

Motor 78 is an alternating current synchronous motor with the stator field created by windings on one or more pole pairs. Referring to FIGS. 25, 27 and 38 in the preferred form one pole pair 110a of the stator 11 is geometrically displaced 90° to the other pole pair 110b. The current in one pole is phase shifted in relation to the mains current in the other pole. The permanent magnet (not shown) in the rotor 100 has two poles, aligned diametrically. The magnet rotates synchronously with the stator field, with an angular relationship to the stator field determined by the load.

Figure 26:
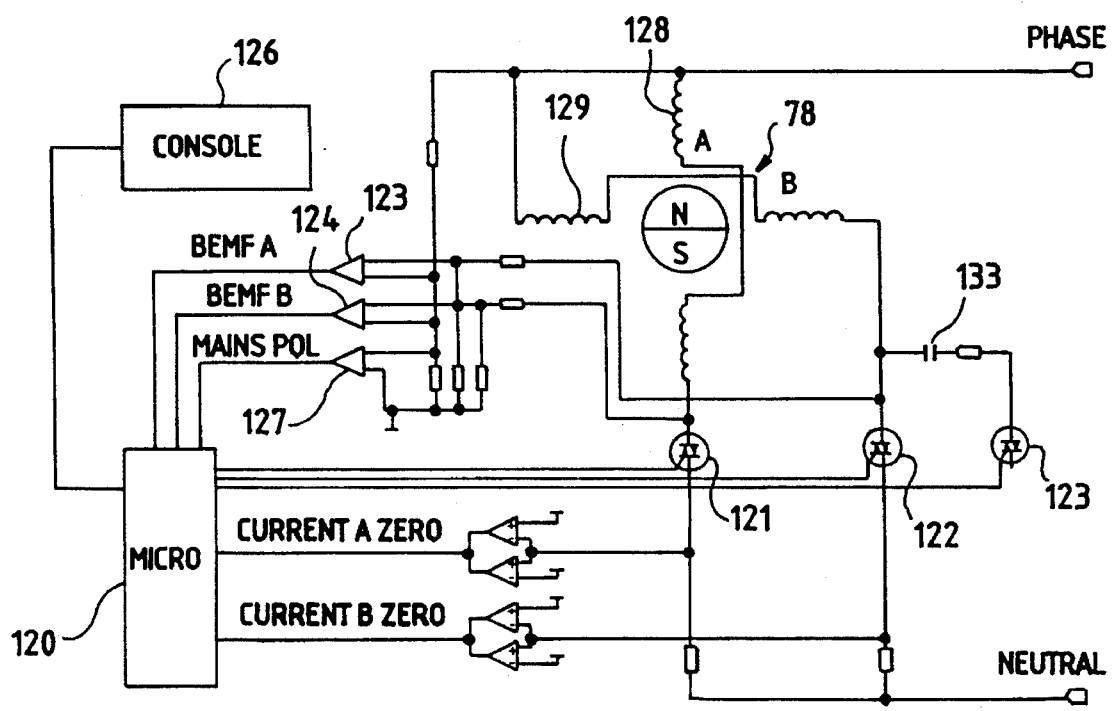
Figure 32:
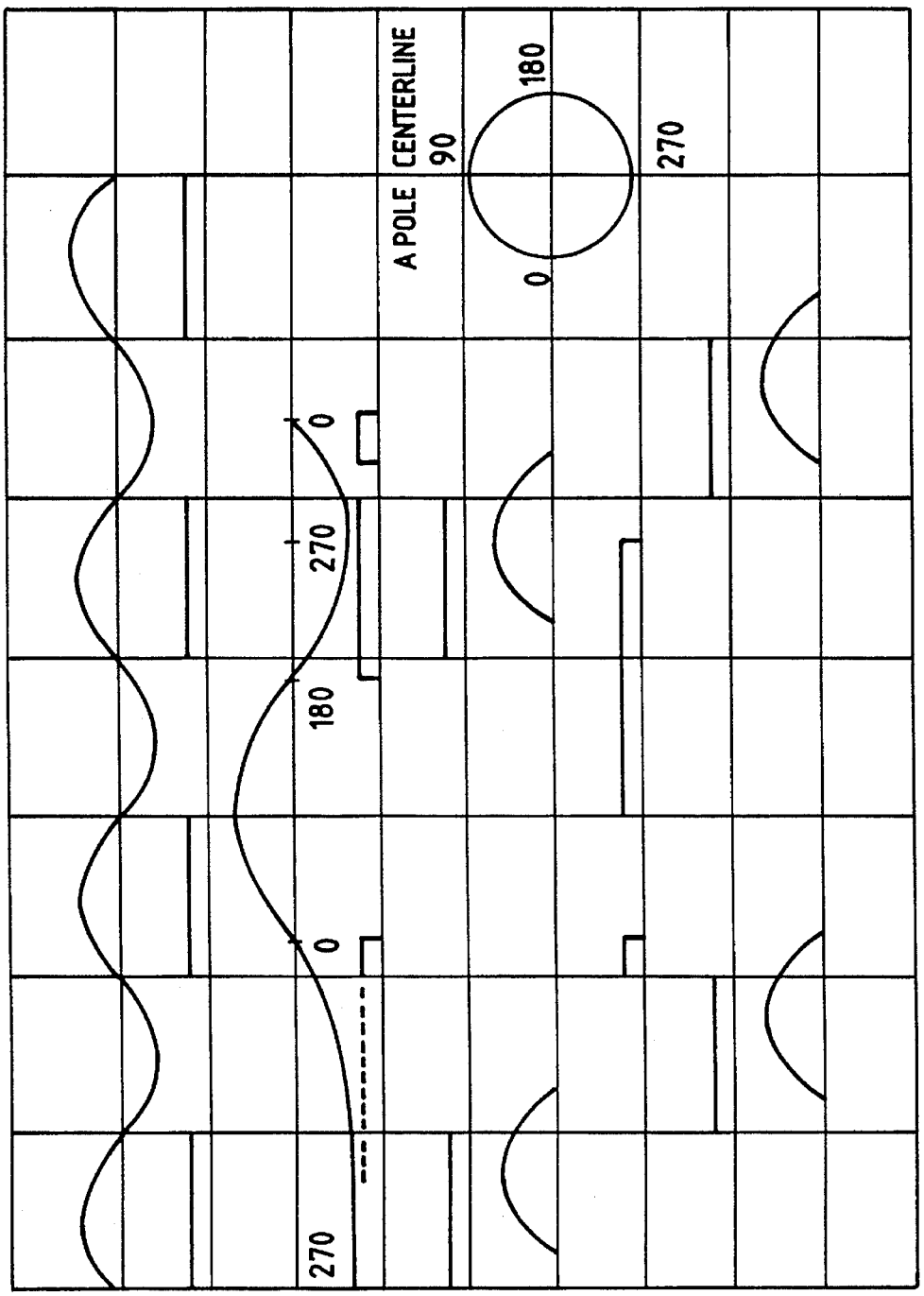
FIG. 32 is a waveform diagram of pulses formed by the motor drive circuit.

Being an AC synchronous motor, a starting method is required to bring the rotor to synchronous speed in a required direction. A drive circuit which provides commutation to achieve this is shown in FIG. 26. Corresponding wave form diagrams are shown in FIG. 32. The mains voltage polarity is monitored by polarity detector 127 and the magnet position is monitored by means of back EMF sensing in the stator windings 128 and 129. Comparators 123 and 124 detect back EMF zero crossings. The output of comparators 127, 123 and 124 are indicated by wave forms 32(b), 32(d) and 32(g) respectively. Other sensors (rather than back EMF) could be used such as optical or Hall effect sensing. The stator windings are switched across the single phase AC supply by triacs 121 and 122 respectively as will be described. Switching is controlled by programmed microcomputer 120. The running direction of motor 78 is determined by startup commutation algorithm stored in the microcomputer. This algorithm compares instantaneous mains polarity (waveform 32(b)) with instantaneous rotor magnet position (waveform 32(b) or 329g)). The algorithm provides gate pulses (waveforms 32(e) and 23(h)) to the triacs 121 and 122 only if the resultant torque which would be produced is in the required direction. The triacs of course, once turned on, will remain on until current through each device is zero. The resultant stator winding currents are shown as waveforms 32(f) and 32(c), phase shifted in relation to the respective gate signals.

The back EMF signal may be derived form the non-energised stator windings. It should be appreciated that the drive technique disclosed involves simply taking power from the mains at points in the mains cycle when a pulse of power would be beneficial for rotation of the motor. There is no attempt to synthesise commutation waveforms from a direct current supply derived from the mains.

When the microcomputer determines from back EMF zero crossing frequency that the rotor speed is close to synchronous with the rotating stator field the motor is switched to run directly from the mains as a splite phase motor without any need for electronic commutation. It will be appreciated that during electronic commutation only one stator winding is energised at any one time and this limits the motor power. For synchronous running triac 121 remains ON to connect winding pair 128 across the mains while triac 122 is switched OFF. At the same time triac 123 is switched ON to energise winding 129 pair via resistor-capacitor network 133 which applies a 90° lagging current to that winding pair.

To enable the motor to run over the range of input voltage and output power required, a method of limiting input power to the motor is applied. This is achieved by switching the triac 121 to phase angle cut the supply to stator winding 128, so regulating the current magnitude and hence controlling motor input power.

With a motor and motor control system as described motor torque can be monitored to infer wash pump and drain pump mode conditions such as: (i) wash pump operating normally, (ii) wash pump ventilating, (ii) low or nil water in the system, (iv) foaming of the wash liquid occurring, (v) wash pump blocked or stalled, (vi) drain pump operating normally, (vii) all liquid pumped out in drain mode and (viii) drain pump blocked or stalled.

Figure 33:
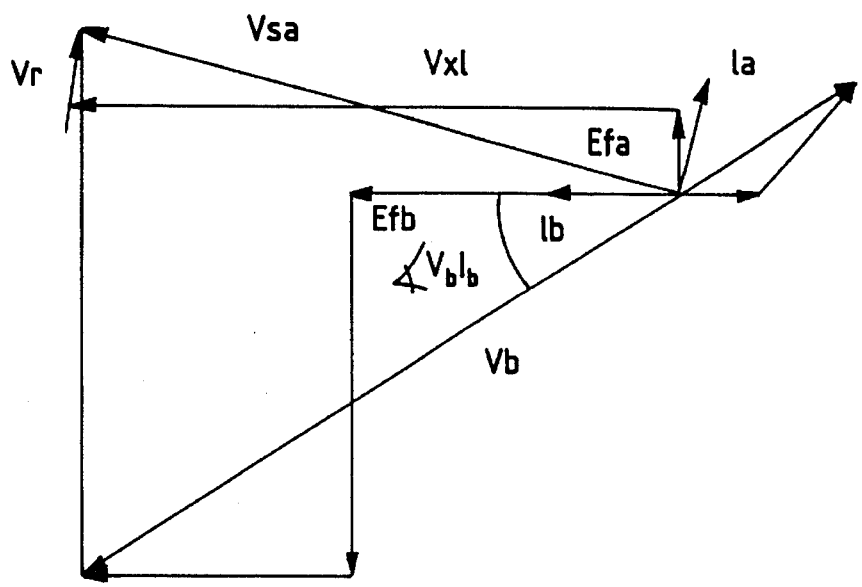
FIG. 33 is a phasor diagram illustrating motor torque monitoring.

The motor torque is monitored as follows. Referring to FIG. 33 each pole pair winding 128 and 129 has voltage and current values referred to as $V_a$ and $I_a$ and $V_b$ and $I_b$. When the microcomputer compares the value of the relationship between these two phase angles with a range of pre-determined values, the degree of potential torque output of the motor at that time, can be determined.

When the motor runs in the reverse direction for draining, the start up method is unchanged. However, when synchronous or near synchronous speed is detected, and run mode is selected, only one set of poles continue to operate—that is, the motor becomes a single pole pair motor. The additional complexity required to run on both pole pairs in the reverse direction is unnecessary as less power is required to operate the drain pump. The motor run mode for the applications described does not involve commutation from the drive circuit, but in other low power applications the motor could be permanently commutated by the drive circuit. The configuration of the motor stator can be seen in FIG. 27. Two orthogonal salient pole pairs 110a and 110b carry windings 128 and 129. The pole taps lie on a common circle of a radius slightly greater than the drain pump casing or well 106. The salient poles are made p of motor grade iron laminations in a conventional manner.

The flux return path for the salient poles is provided by a laminated iron ring 125. This ring also helps to structurally support the salient poles which are shaped at their extremities to "dovetail" into appropriately shaped recesses 156 in ring 125.

Figure 42:
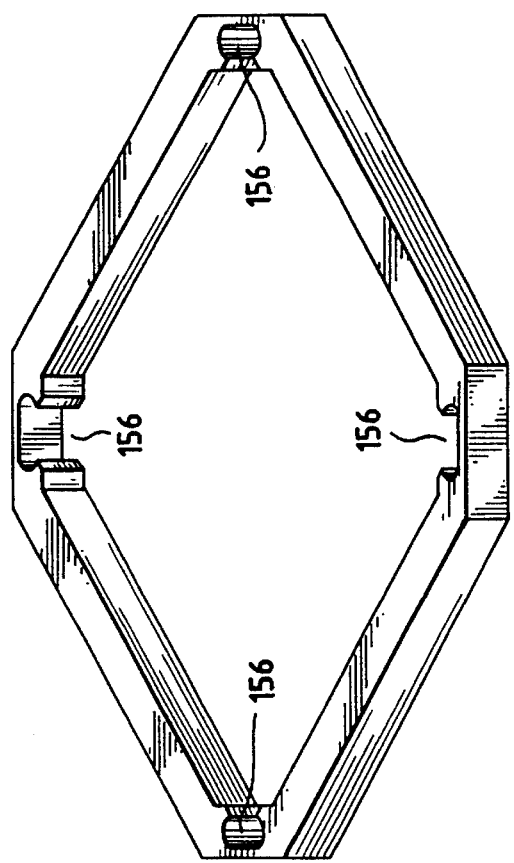
FIG. 42 shows an isometric view of the motor stator.
Figure 43:
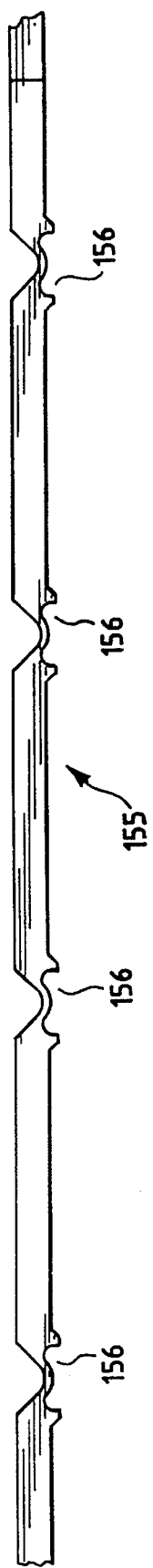
FIG. 43 shows a portion of the blank lamination material prior to formation as the stator of FIG. 42.

Ring 125 is made up by stamping a continuous length of laminating strip (see FIG. 43) with recesses 156 to provide for salient pole dovetails and bending into the square ring configuration shown in FIG. 42. The blank stator material is edgewise wound in helical fashion to form a stack of laminations of the desired thickness with the square configuration shown and recesses 156 in each corner for dovetail engagement with the salient poles.

In use on the dishwasher the stator is filled under the wash chamber floor so the salient pole engages circumferentially about well 106 and this line up with the permanent magnet rotor 100 mounted within the well. A very low height pancake shaped motor is able to be formed in this matter with the advantage that no dynamic shaft seal with the wash chamber is required due to the rotor being mounted inside the well and separated from the stator by the thickness of the well walls which lie in the motor air gap.

Operation

The operation of a dishwasher according to the present invention is as follows. The drawer 17 is withdrawn from the cabinet 4 and dishes stacked in a rack within the washing chamber. The drawer 17 is then closed and lid 66 simultaneously seals against the top of the wash chamber 3. Microcomputer 120 then initiates the manually chosen cycle of operation. Inlet valve 51 is opened causing the water tank to fill to the level shown in FIG. 14 i.e. just below the loop of the syphon tube 55. The inlet valve is again opened and tank 33 filled until syphoning occurs whereupon the inlet valve is closed. The controlled volume of water discharged into the wash chamber 3 may be used for rinsing or washing, as selected. If rinsing washing is required the electric motor 78 is switched on to rotate in the appropriate direction to cause the wash pump 95 to operate. As a result of the wash pump casing being formed by part of the spray arm there is a reaction between the pump impeller and the spray arm causing the spray arm to rotate by partial fluid coupling. At the same time the wash pump causes discharge of water from the spraying nozzles 76. After spraying the soiled water returns to the lower part of the washing chamber, passes through the aperture 81 in the filter plate and is drawn through the passageway 80 into the wash pump to be recirculated.

The wash cycle is substantially similar to the rinse cycle except the water in the wash chamber will be heated during activation of the wash pump.

When a cycle of washing has been completed, for example, a cold rinse, the electric motor 78 is stopped and its direction of rotation reversed. As a result the drain pump impeller 101 is operated to drain rinse water from the wash chamber through the hose 37 for delivery to waste. After drainage has been completed, refilling of the washing chamber takes place in the manner described.

At the completion of the wash programme the drying cycle commences. Water on the dishes is vaporised by the residual heat in the wash chamber and load. The tank 33 is filled with cold water 119. The common wall 34 will cool and water vapour in the chamber 3 produced after the final hot rinse condensed thereon. This obviates the need to vent hot water vapour from the dishwasher. When the drying cycle is completed the drawer 17 is opened and the dishes and removed for storage or for use as desired.

Detergent may be dispensed into the washing chamber by use of a detergent dispenser such as that disclosed in either our New Zealand Patent Specification 234271 dated 27 Jun. 1990, or preferably our New Zealand Patent Specification 238504 dated 12 Jun. 1991.

By way of example only a typical wash programme for a moderately soiled load is set out below:

1) Dishwasher loaded, programme selected and switched on.
2) Controller turns on inlet valve and syphon starts and tub fills (tank already fill up to pre-syphon point from previous use).
3) Wash pump starts for a cold pre-rinse. No heating occurs. 3 minute duration.
4) Wash pump stops, motor reverses and pumps out wash liquid.
5) Tub refills and wash pump re-starts for main wash. Heater switches on, until temperature reaches 65° C. At 45° C. the detergent dispenser releases its detergent.
6) When 65° C. is reached, heater turns off. Washing continues. Tank fill to pre-syphon point and is pre-heated by the hot wash liquid in the tub.
7) After 5 minutes after reading 65° C., washing stops, motor reverses and drains tub.
8) Tub fills with pre-heated liquid, for first post rinse. No heating this rinse. Tank refills to pre-syphon point and pre-heats.
9) After three minutes washing stops, liquid pumped out, pre-heated liquid fills tub.
10) Final rinse begins, with heater up to 65° C. At 55° C. rinse aid is dispensed.
11) At 65° C. final pump out occurs.
12) At completion of pumpout, tank refills to pre-syphon point and drying cycle commences.
13) After approximately 30 minutes, wash load is ready for removal if desired.

This programme has a duration of approximately 35 minutes and water usage is 8 liters of water.

ADVANTAGES

The dishwasher of the present invention, at least in one or more preferred forms, has the following advantages:

1. Motor

The permanent magnet rotor runs in the wash liquid thereby precluding any need for contacting dynamic seals to contain liquid in the system.

The permanent magnet, synchronous type motor is a comparatively high efficiency motor which does not require forced cooling.

The chosen pole configuration allows for the shallow height of motor (in the axial direction).

Simple and reliable electronic starting method.

The motor operating principle and self monitoring systems ensures constant, synchronous operation. If asynchronous running is detected, the motor will stop and restart automatically. The motor has two pole pairs to achieve the high torque required and has the second set of poles capacitor shifted 90° to minimise the electronics required.

When running in reverse, the motor uses one pole pair to also reduce the electronic componentry required.

2. Washpump/Spray Arm

The placement of the wash pump inside the spray arm removes the need for any of the conventional pipework connecting the two devices. This means that there is practically no 'dead' volume in the system, minimising the liquid volume required for the pump to operate.

Also, this absence of pipework means losses are minimised i.e. high hydraulic efficiency.

Spray arm rotation is created by the partial fluid coupling between the wash pump impeller and the pump volute. Rotation speed adjustment can be made by using a small degree of reaction from jets. Normally in prior arrangements the pump is a separate unit situated below the sump and connected to the spray arm by means of pipe work. Some dishwashers have the pump housing as part of the sump. Such systems are disadvantageous for the following reasons.

a) The vertical space requirement of a separate pump and spray arm precludes the possibility of designing an extremely compact dishwasher.
b) The often complicated pipe work accounts for inefficiencies through friction losses.
c) The plumbing between the pipe and spray arm is a dead volume for washing liquid and opposes efforts to reduce liquid consumption.

The present invention at least in the preferred form, is aimed at overcoming these disadvantages and providing the following further advantages.

a) A pump and spray system wherein centrifugal type pump is mounted integrally with a rotating spray arm. The pump discharges the wash liquid directly into the arms of the spray arm without intervening plumbing.
b) The compactness of pump and spray system facilitates maximal usable space within a given dishwasher height or for a given load capacity thus promoting the design of compact dishwashers.
c) Because there is no pipe work between the pump and the spray arm and hence no frictional losses the overall efficiency is vastly improved compared to conventional systems. This results in smaller power requirements for the motor.
d) Because of the lack of pipe work there is an absolute minimum volume in the system requiring filling before the system operates which facilitates low water usage and reduced energy consumption.
e) By virtue of the fluid coupling between the pump impeller and the pump housing, power to rotate the spray arm is transmitted from the impeller to the spray arm. Therefore conventional reaction jets which may e used but are preferably not used, use additional wash liquid and do not usually contribute to the wash action.
f) It is possible to produce the complete pump and spray system in two parts, one being the spray arm pump housing and the other being the pump impeller, the system is therefore intrinsically simple.
g) Should the pump malfunction because of a blockage, lifting off the spray arm exposes the impeller and other parts for cleaning.
h) Separate bearing systems for a pump and a spray arm are avoided.
i) Rationalisation of parts reduces manufacturing costs.
j) As no connections are necessary between the pump outlet pipe work and spray arm which are usually outside the dishwasher tub the potential of leaks in this area is removed.

To enable the washing pump to operate without ventilating (pumping air) and with only minimal suction head available, a large intake area for the pump is employed. The pump intake is an annular area at approximately 300 mm diameter and approximately 7 mm high. This allows for a pump performance in the range of 65 liters/minutes at a head of 2 meters that requires only 2 liters of liquid in which to operate.

The wash pump impeller is of the mixed flow type, with a radial centrifugal outlet and an optimised axial flow inducer at the inlet.

This inlet inducer benefits the pump priming in the wash mode and helps prevent the spray arm volute priming when in the drain mode. The drag created by the wash pump in the drain mode is also reduced by the inlet inducer.

Both these benefits reduce the drain mode power requirements, aiding the motor running on one pair of poles—as a result of the improved priming ability of this pump, the wash pump intake is successfully located below the wash pump housing.

3. Drain Pump

The drain pump impeller is an adaptation of a paddle type pump that is optimised in such a way that the maximum pumping performance is achieved in the drain mode, yet the opposite direction i.e. wash mode, no pumping occurs and low drag is generated.

The low drag generated when the drain pump is operating in reverse means that there is maximum motor power available to drive the wash pump.

The drain impeller detail is moulded integrally with the motor rotor.

The drain pump housing is integral with the motor housing and central plain bearing for the rotor.

Should the drain pump become blocked, jammed or require any servicing it can be accessed by removing the spray arm 75, the filter plate 104 which will also lift the motor rotor 100 off its bearing shaft 99, revealing the drain pump housing 100 which also forms the rotor housing.

Upon drain pump startup, any unwanted air present in the drain pump can escape up between the motor rotor and the motor housing. To check the flow of wash liquid through this path after the air has been passed, a centrifugal pump impeller detail is moulded on the top face of the motor rotor which in effect opposes the flow of any liquid trying to escape.

We claim:

1. A cabinet for a household appliance including an open sided box compartment which is able to resist racking forces applied parallel to the open side comprising: four side walls and a back wall of thin sheet material joined along their edges to leave a substantially rectangular front opening defined by the front edges of the four side walls, and co-planar internally directed flanges on said four front edges, connection means connecting said flanges on three contiguous edges for rigidly joining two corners and for configuring as a tapered beam portal frame with moment resisting corners and the flange on the fourth edge forming a beam linking the flanges which form the extremities of the portal frame, and means between the flanges for forming the beam and portal frame respectively which provide no substantial resistance to bending moments.

2. A cabinet according to claim 1 wherein said flanges are integrally formed from extended portions of said four side walls, which portions are bent at right angles to said walls and joined at adjacent ends of the flanges so formed.

* * * * *